United States Patent [19]

York

[11] Patent Number: 4,988,935

[45] Date of Patent: Jan. 29, 1991

[54] ADVANCED DIGITAL MOTION CONTROL

[75] Inventor: James E. York, Endicott, N.Y.

[73] Assignee: Universal Instruments Corporation, Binghamton, N.Y.

[21] Appl. No.: 356,372

[22] Filed: May 24, 1989

[51] Int. Cl.$^5$ ............................................ G05B 19/407
[52] U.S. Cl. ................................ 318/568.18; 318/561; 364/157; 364/164
[58] Field of Search ................... 318/568.18, 574, 561; 364/157, 164

[56] References Cited

U.S. PATENT DOCUMENTS 4,533,991 8/1985 Georgis ............................ 318/561 X
4,829,219 5/1989 Penkav ............................ 318/568.18

Primary Examiner—William M. Shoop, Jr.
Assistant Examiner—Saul M. Bergmann
Attorney, Agent, or Firm—Fidelman & Wolffe

[57] ABSTRACT

Advanced digital motion control is a multi-axis incremental position control system which includes a digital processor and memory, servo motor actuator with tachometer feedback, velocity servo power amplifier, position feedback device, position feedback signal converter, and digital to analog converter. The processor provides digital time reference feedback control of motion profiling and positioning of the mechanical load for multi-axis simultaneously without sacrificing update feedback rate control. The read time code execution time is compact and speed efficient optimizing control of multi-axis high speed/high accuracy servo systems in a space and cost effective method.

11 Claims, 26 Drawing Sheets

FIG.23

```
KEY OFF: SCREEN 0: VIEW PRINT 1 TO 25: COLOR 7, 1: CLS
------------------------------------ INPUT MOTION PARAMETERS ------------------------------------

Distance = 1000: '        Encoder feedback counts
Velocity = 100: '         Encoder feedback counts / millisecond
Acceleration = 1000: '    Encoder feedback counts / millisecond-squared
Tip.comp = 100: '         Percent compensation [ 100 = 0% compensation ]
Curve$ = "SCURVE": '      Profile type selection [ SCURVE or TRAPEZOID ]

**************************************************************************************
************************************ PRECALCULATIONS *********************************
**************************************************************************************

Accel.distance = INT ( ( ( Velocity * 10 ) ^ 2 ) / ( Acceleration * 2 ) ) * 10

IF Curve$ = "SCURVE" THEN
    Midpoint = INT ( Distance / 2 )
ELSE
    Midpoint = INT ( ( ( INT(Distance / 2 ) ) * Tip.comp ) / 100 )
END IF IF Accel.distance > Midpoint THEN
    Accel.distance = Midpoint * 1024
    Time.accel = INT ( SQR ( INT ( Accel.distance / INT ( Acceleration / 2 ) ) ) )
    Velocity.scale = INT ( ( 2 * Accel.distance ) / Time.accel )
ELSE
    Velocity.scale = Velocity * 1024
    Accel.distance = Accel.distance * 1024
    Time.accel = INT ( ( Velocity * 1000 ) / Acceleration )
END IF Slew.distance = ( Distance * 1024 ) - ( Accel.distance * 2 )
Slew.time = INT ( Slew.distance / Velocity.scale )
Remainder = Slew.distance MOD Velocity.scale
Total.accel.dist = Remainder + ( Accel.distance * 2 )
Accel.inc = INT ( Total.accel.dist / ( Time.accel ^ 2 + Time.accel ) ) * 1024
Remainder = Total.accel.dist MOD ( Time.accel ^ 2 + Time.accel )
IF Remainder > 4194303 THEN
    Remainder = INT ( Remainder / INT ( ( Time.accel ^ 2 / 1024 ) ) )
ELSE
    Remainder = INT ( ( Remainder * 1024 ) / ( Time.accel ^ 2 ) )
END IF
Accel.inc = Accel.inc + Remainder If Curve$ = "SCURVE" THEN
    Midtime.Accel = INT ( Time.Accel / 2 )
    Remainder = Time.accel MOD 2
    Accel.Inc = INT ( ( 2 * 256 * Accel.Inc ) / ( Midtime.accel + 1 - Remainder ) )
END IF
```

FIG.24

```
************************************************************************
*************************TRAPEZOID REAL TIME VELOCITY PROFILE*************
************************************************************************

Velocity.sum = 0
Distance.sum = 0
-------------------------------------------ACCELERATION-------------------------------------

Clock.tick = 0

DO
      Clock.tick = Clock.tick + 1
      Velocity.sum = Velocity.sum + Accel.inc
      Distance.sum = Distance.sum + INT(Velocity.sum / 1024)
      IF Clock.tick = Time.accel THEN EXIT DO
  LOOP
  Velocity.sum = Velocity.sum + Accel.inc -------------------------------------------------SLEW-----------------------------------------------

Clock.tick = 0

DO
      IF Clock.tick = Slew.time THEN
          EXIT DO
      ELSE
          Clock.tick = Clock.tick + 1
          Distance.sum = Distance.sum + Velocity.scale
      END IF
  LOOP -----------------------------------------DECELERATION-----------------------------------------

Clock.tick = 0

DO
      Clock.tick = Clock.tick + 1
      Velocity.sum = Velocity.sum - Accel.inc
      Distance.sum = Distance.sum + INT(Velocity.sum / 1024)
      IF Clock.tick = Time.accel THEN EXIT DO
  LOOP PRINT "Distance summation            = " ; Distance.sum / 1024
  PRINT "Total time                    = " ; 2 * Time.accel + Slew.time
  END
```

FIG.25

```
************************************************************************
************************* S-CURVE REAL TIME VELOCITY PROFILE *************************
************************************************************************

Accel.sum = 0
Velocity.sum = 0
Distance.sum = 0

--------------------------------- INCREASING ACCELERATION RATE---------------------------------

Clock.tick = 0

DO
    Clock.tick = Clock.tick + 1
    Accel.sum = Accel.sum + Accel.inc
    Velocity.sum = Velocity.sum + INT(Accel.sum / 256)
    Distance.sum = Distance.sum + INT(Velocity.sum / 1024)
    IF Clock.tick = Midtime.accel THEN
        Accel.sum = Accel.sum + Accel.inc
        EXIT DO
    END IF
LOOP --------------------------------- DECREASING ACCELERATION RATE---------------------------------

DO
    Clock.tick = Clock.tick - 1
    Accel.sum = Accel.sum - Accel.inc
    Velocity.sum = Velocity.sum + INT(Accel.sum / 256)
    Distance.sum = Distance.sum + INT(Velocity.sum / 1024)
    IF Clock.tick = 0 THEN
        Accel.sum = Accel.sum - Accel.inc
        Accel.sum = Accel.sum - Accel.inc
        EXIT DO
    END IF
LOOP -----------------------------------------------SLEW-----------------------------------------------

Clock.tick = 0

DO
    IF Clock.tick = Slew.time THEN
        EXIT DO
    ELSE
        Clock.tick = Clock.tick + 1
        Distance.sum = Distance.sum + Velocity.scale
    END IF
LOOP
```

FIG.26

------- INCREASING DECELERATION RATE -------

Clock.tick = 0

```
DO
    Clock.tick = Clock.tick + 1
    Accel.sum = Accel.sum + Accel.inc
    Velocity.sum = Velocity.sum - INT(Accel.sum / 256)
    Distance.sum = Distance.sum + INT(Velocity.sum / 1024)
    IF Clock.tick > Midtime.accel THEN
        Accel.sum = Accel.sum + Accel.inc
        EXIT DO
    END IF
LOOP
```

------- DECREASING DECELERATION RATE -------

```
DO
    Clock.tick = Clock.tick - 1
    Accel.sum = Accel.sum - Accel.inc
    Velocity.sum = Velocity.sum - INT(Accel.sum / 256)
    Distance.sum = Distance.sum + INT(Velocity.sum / 1024)
    IF Clock.tick = 0 THEN EXIT DO
LOOP
```

```
PRINT "Distance summation    = " ; Distance.sum / 1024
PRINT "Total time            = " ; (4 * Midtime.accel) + Slew.time
END
```

ADVANCED DIGITAL MOTION CONTROL

BACKGROUND OF THE INVENTION

Prior methods of motion control were based on fixed "servo curve tables". The "servo curve table" does provide a quick "lookup" algorithm that allows the single microprocessor code timing to complete 8 axis of real time position feedback comparison with the table elements in less than a millisecond. The lookup table consists of 127 error distance ranges for acceleration control and 127 error distance ranges for deceleration control. Each error distance range table element contains an associated velocity reference value. The change in error distance controls the change in velocity thus controlling the acceleration and deceleration rate.

The error distance values are in units of encoder feedback counts which can be translated to linear or rotary units such as inches or degrees. The reference command velocity is in digital units that is converted to an analog signal by a digital to analog converter. This analog signal is input to a suitable power amplifier that supplies power amplification and closed loop velocity and current control of the servo actuator.

Motion control of high performance servo axis using this method has many disadvantages that are improved upon with advanced digital motion control.

The programmability of multiple acceleration and deceleration rates are required because of sensitive force-mass applications such as picking, transporting, rotating and placing various size surface mount components with servo drive actuators. The memory space requirements to store all "servo curve table" rate requirements for up to eight different axis is limited or impossible with a single microprocessor controller.

There is no digital reference time control of the motion profile, thus performance accuracy and repeatability is limited by the quality of the analog velocity loop, variations in electrical tolerances and mechanical system tolerances. Applied to a system this affects machine cycle rate, motion force accuracy, jerk force variability, position overshoot, and position settling time.

SUMMARY OF THE INVENTION

The advanced motion control system in accordance with the present invention provides multi-axis single microprocessor closed loop point to point positioning with acceleration, deceleration and velocity control. Adjusting the motion profile and servo gain coefficients of an individual axis is done simply by changing numeric variables before the start of motion.

The motion profile is then calculated while the motion is in progress at discrete time intervals. The motion command profile is generated from an internal software reference algorithm. This digital standard is compared against the actual axis encoder feedback position. If an error exists between them then a controlled amount of gain is provided to the servo motor system to reduce the error to zero. The motion reference profile is thus commanding the servo axis to be at a certain position at a certain time during the entire point to point movement.

The function of time in the control loop maintains a digital reference reducing the effects of variations in analog velocity loop components and mechanical systems The present invention has a number of advantages over conventional "lookup" table motion control systems. The present invention uses digital control of the position loop. A servo rate loop time of one millisecond ensures a digital control loop bandwidth suitable for high performance motion. The acceleration/deceleration rates can be changed before any point to point move. Also, velocity can be changed before any point to point move.

The motion control system of the present invention utilizes either of two preferred motion profiles, a trapezoid or s-curve velocity time profile. The selection of either the trapezoid or the s-curve velocity-time profile can be changed before any point to point move. The trapezoid profile contains components of jerk at the velocity transition points but requires one-half the peak acceleration rate compared to the s-curve if distance and time remain the same. The s-curve motion profile provides smooth profile control of the rate of change in acceleration or deceleration applying a low jerk force to the mechanical structure in motion.

The system provides separate tuning parameters to lock on the target position. Tuning parameters allow a wide range of adjustments to satisfy all requirements of servo system performance. Software integration techniques ensures positioning repeatability, accuracy, and stability under variations in mechanical system friction, spring loads, and gravitational forces.

The system also includes a position error detection window, which provides software safety detection of the servo axis system due to mechanical crashes or operator interference. The servo axis motors will come to a complete stop as soon as the position error window exceeds a programmable amount of error position.

The preferred embodiments of the present invention have digital error command resolution of 10 bits and sign. This provides 10 millivolts of analog resolution signal to drive the servo power amplifier. Maximum voltage limit equals + or −10 volts. The preferred embodiments also include super fine digital error command resolution scale of 2.5 millivolts of analog resolution signal to drive the servo power amplifier whenever the axis is near the target position. Maximum voltage limit equals + or −2.5 volts. The system preferably has an absolute positioning range of 22 bits. Total feedback encoder count capacity=4,194,304 counts.

BRIEF DESCRIPTION OF THE DRAWINGS

FIG. 23-26 show software code for the profile generator model in Quick Basic TM (Microsoft Corp.).

DETAILED DESCRIPTION OF THE PREFERRED EMBODIMENTS

Figure 1:
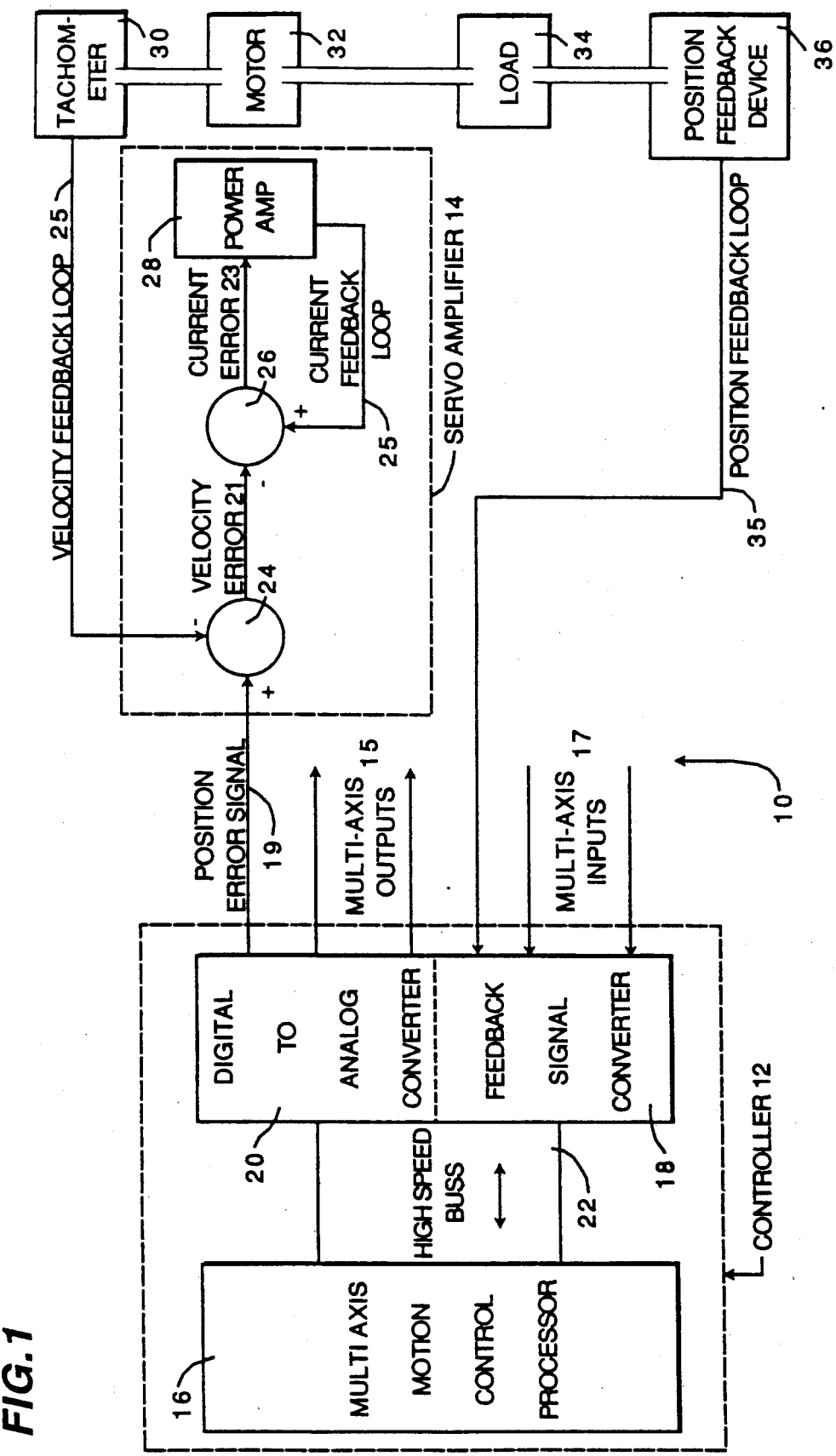
FIG. 1 is a block diagram of the hardware control loop in accordance with a preferred embodiment of the present invention.

The present invention is directed to a system for generating a motion control profile for advance motion control of a high performance servo axis, for use, for example, in chip placement systems for placing components on printed circuit boards, such as the Omniplace B TM manufactured by Universal Instrument Corporation of Binghamton, N.Y. The system in accordance with the present invention is shown in FIG. 1 and generally designated 10. Throughout the Figures, like numerals are used to represent like elements.

Advanced motion control system 10 includes a controller 12 having multi-axis outputs 15 and multi-axis inputs 17, and a servo amplifier 14 which drives a motor 32 which, in turn, drives a load 34. A velocity feedback loop 25 is provided from motor 32 via a tachometer 30. A position feedback loop 35 is provided from load 34 via a position feedback device 36.

Controller 12 comprises a multi-axis motion control processor 16, a digital to analog converter 20 and a feedback signal converter 18. Digital to analog converter 20 and feedback signal converter 18 communicate with multi-axis motion control processor 16 via high speed buss 22. Feedback signal converter 18 inputs multi-axis inputs 17 and position feedback loop 35. Digital to analog converter 20 outputs multi-axis outputs 15 and position error signal 19.

Servo amplifier 14 comprises a first comparator 24 for determining velocity error, a second comparator 26 for determining current error, and a power amp 28. The first comparator 24 compares position error signal 19 the velocity feedback loop 25 and outputs a velocity error signal 21 reflective of the comparison. Velocity error signal 21 is compared with current feedback loop 25 by the second comparator 26 which in turn outputs a current error signal 23. The output of power amp 28 is used to drive the motor 32.

Figure 2:
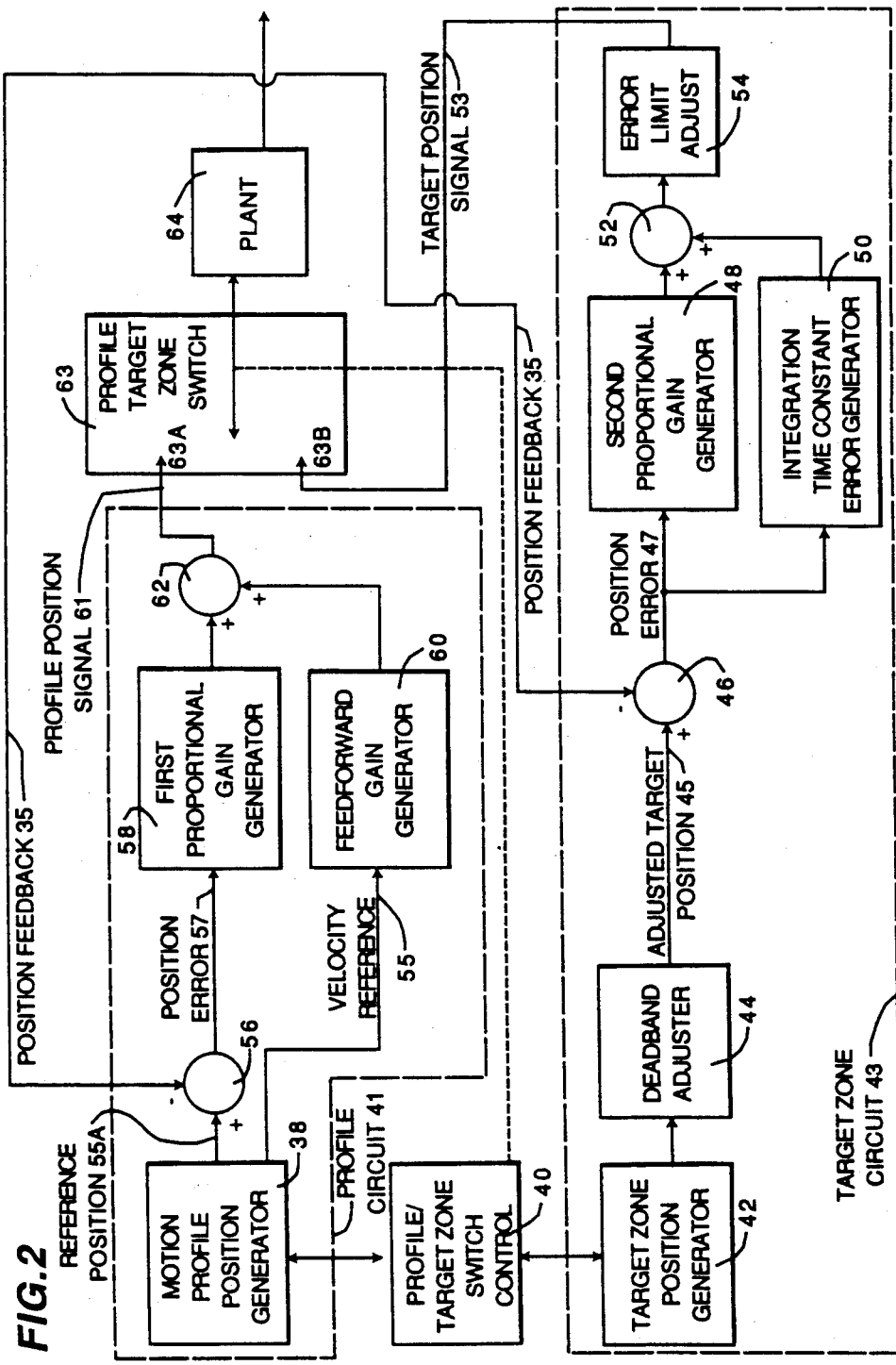
FIG. 2 is a functional block diagram of the software control loop in accordance with a preferred embodiment of the present invention.

FIG. 2 is a functional block diagram of the software embodiment illustrated in FIG. 1. The plant 64 represents the device to be driven or controlled. The input of the plant 64 is controlled by profile/target zone switch 63 having two possible positions. When the switch 63 is in a first position 63a, the plant 64 is in communication with a profile circuit 41. When in a second position 63b, the plant 64 is in communication with a target zone circuit 43. The switch 63 is controlled by profile/target zone switch control 40.

Profile circuit 41 includes a motion profile position generator 38 which communicates with the profile/target zone switch control 40. Velocity reference output 55 is applied to a feedforward gain generator 60 and reference position output 55a is applied to a comparator 56. The comparator 56 compares the position reference output 55A and a position feedback signal 35, described previously with reference to FIG. 1, and produces a position error output 57 which is applied to a first proportional gain generator 58. Outputs from the first proportional gain generator 58 and the feedforward gain generator 60 are applied to a first summation device 62. The output of the first summation device is applied to position 63a of profile/target zone switch 63.

The target zone circuit 43 includes a target zone position generator 42 which communicates with profile/target zone switch control 40 and which produces an output which is applied to a deadband adjuster 44. The deadband adjuster 44 correspondingly outputs an adjusted target position signal 45 which is applied to a fourth comparator 46 along with the position feedback signal 35. The output of the fourth comparator 46, position error signal 47, is applied to second proportional gain generator 48 and to integration time constant error generator 50. The outputs of generator 48 and generator 50 are applied to a second summation device 52, and the corresponding output is applied to error limit adjust 54. Error limit adjust 54 produces an output, target position error signal 53, which is applied to position 63b of profile/target zone switch 63.

The profile circuit 41 provides the digital motion reference for point to point movement. The known input parameters are acceleration/deceleration rate, total distance movement, and maximum velocity. The software profile generator first precalculates the maximum velocity achieved based on the total point to point distance and programmed acceleration rate. If the total distance is greater than the distance to accelerate to constant velocity and decelerate from constant velocity then the motion profile is trapezoidal. If the peak velocity is found to be less than the constant velocity for the total move distance then the motion profile is triangular. The s-curve is derived from the trapezoid or triangle profile.

When the peak velocity obtained is less than the constant velocity and the profile type selected is trapezoidal the software performs a compensation reduction based on a percentage of the peak velocity. The compensation transforms a triangular profile into a trapezoidal profile. The tuning parameter that controls the magnitude of peak velocity reduction is called tip compensation. This reduces the "jerk" forces produced when acceleration changes to deceleration at the peak velocity or tip of the velocity-time profile.

Figure 3:
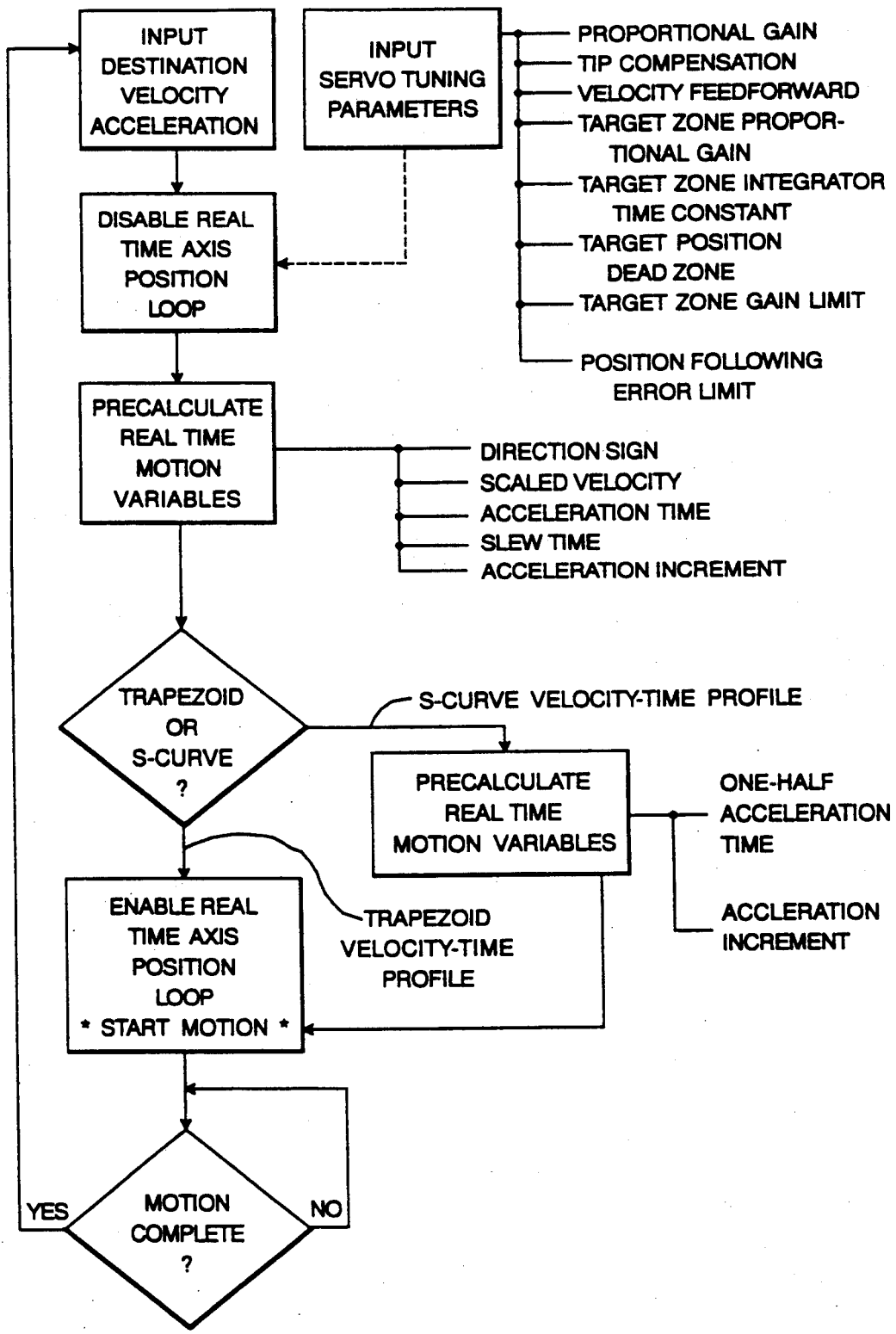
FIG. 3 is a flow chart of the precalculation summary in accordance with a preferred embodiment of the present invention.

All of the above precalculation computations, as summarized in FIG. 3 and shown in detail in FIGS. 6—10, occur before motion starts The precalculated variables are then initialized to start the beginning of "real time" motion. Since optimum servo system performance requires a control rate of one millisecond or less the processor code instruction timing becomes very critical if servicing multiple axis. The profile generator algorithm is based on simple addition, subtraction, and binary shift instructions therefore minimizing the time for instruction execution.

Figure 11:
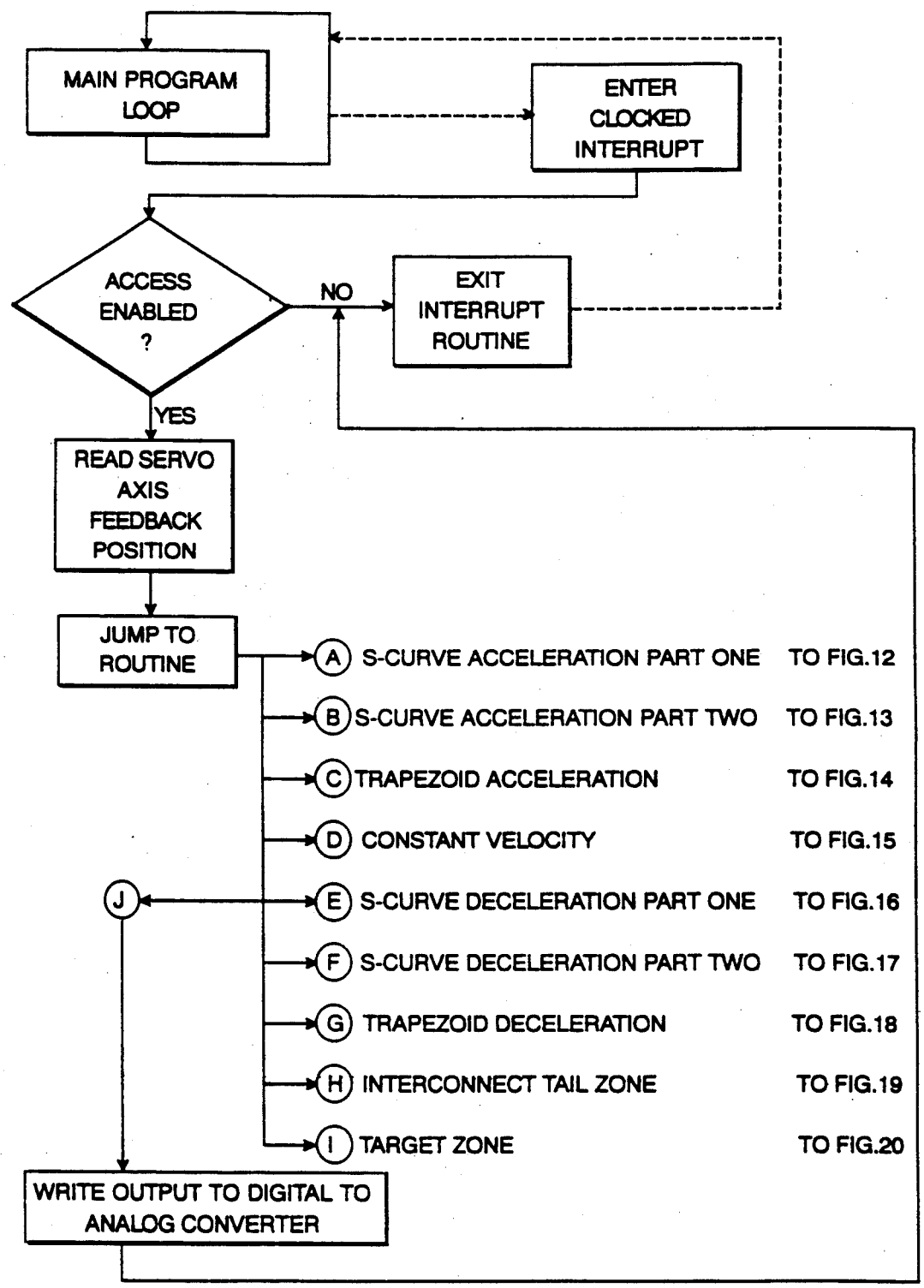
FIG. 11 is a flow chart of the detailed real time interrupt shown in FIG. 4.
Figure 12:
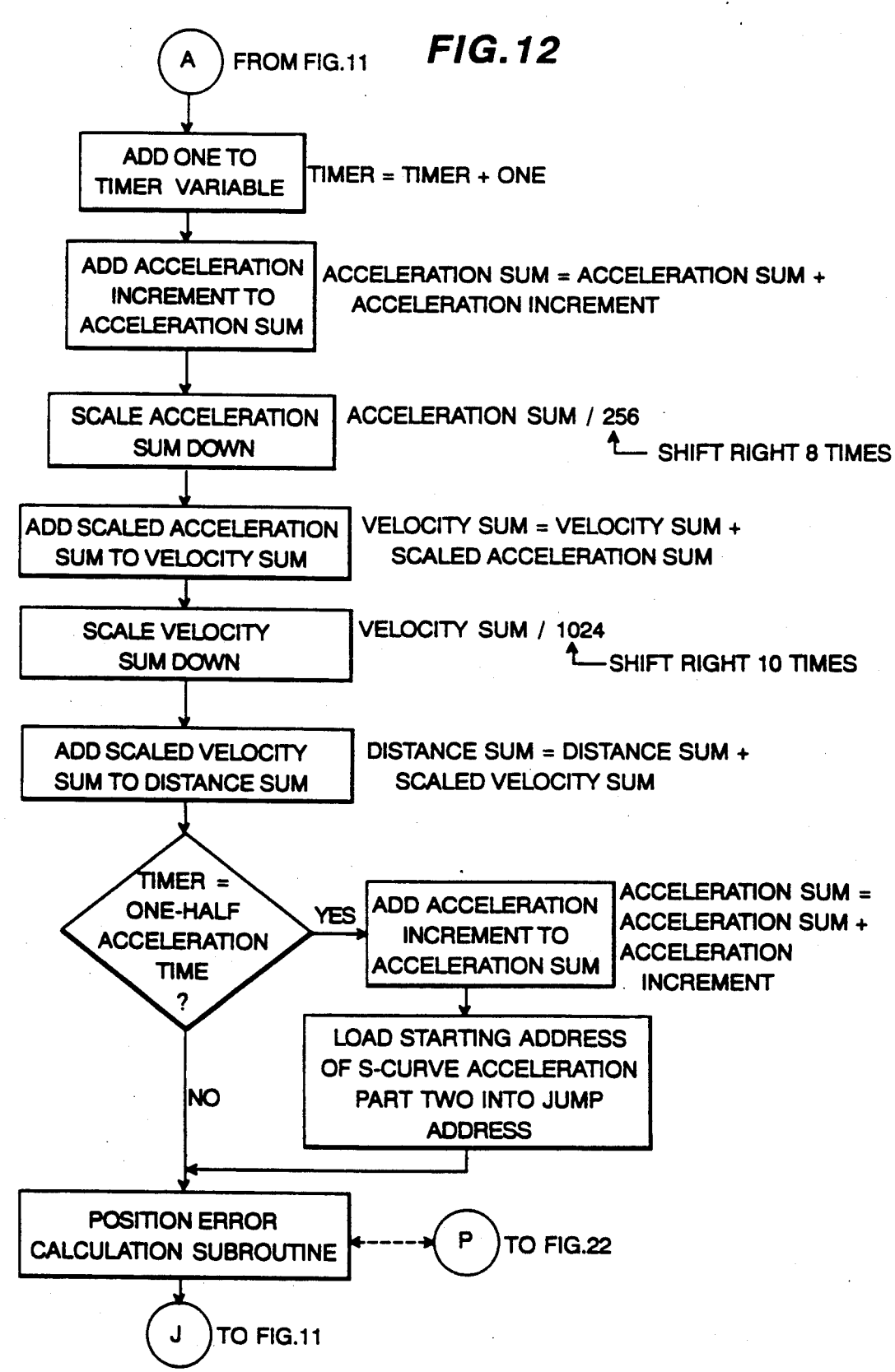
FIGS. 12 and 13 are flow charts of the acceleration portion of the motion profile in accordance with the first preferred embodiment illustrated in FIG. 4.
Figure 13:
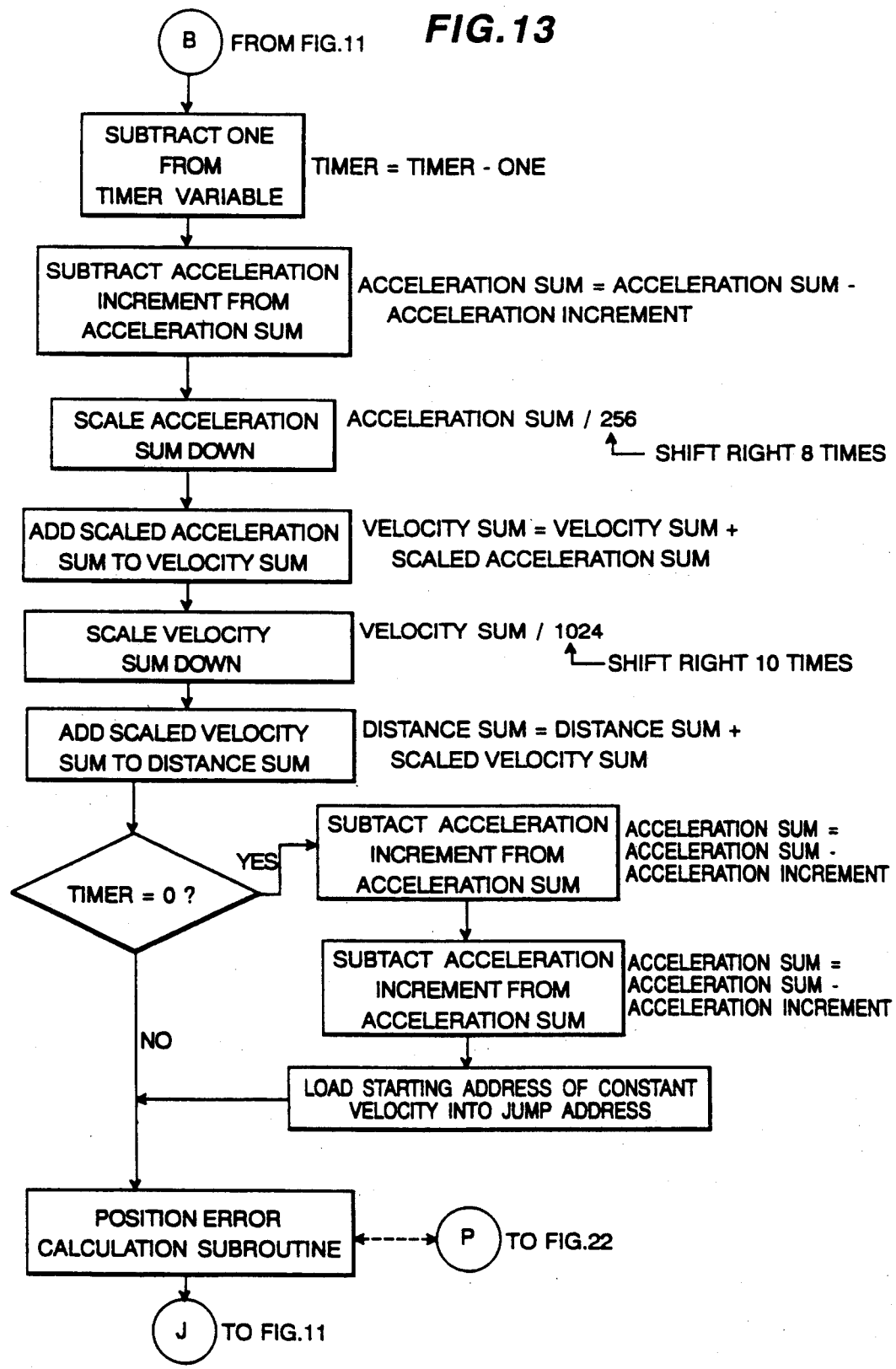

The real time interrupt is shown in FIG. 11. As mentioned above, the motion control system of the present invention utilizes either of two preferred motion profiles, a trapezoid or s-curve velocity time profile. The precalculation permits selection of either the trapezoid or the s-curve velocity-time profile before any point to point move.

Trapezoid Profile Real Time Calculations

Figure 5:
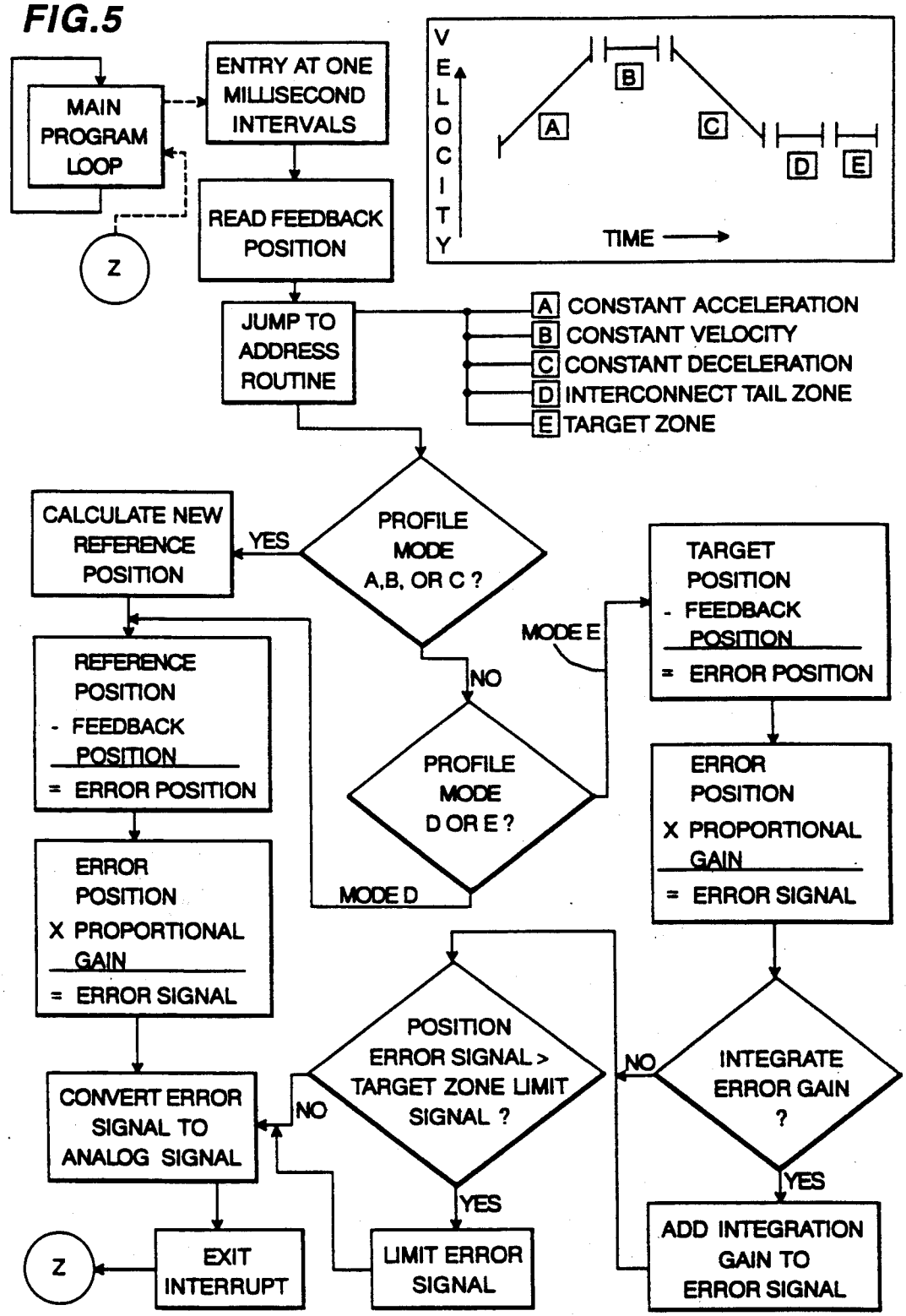
FIG. 5 is a flow chart of the real time interrupt in accordance with a second preferred embodiment of the present invention.
Figure 6:
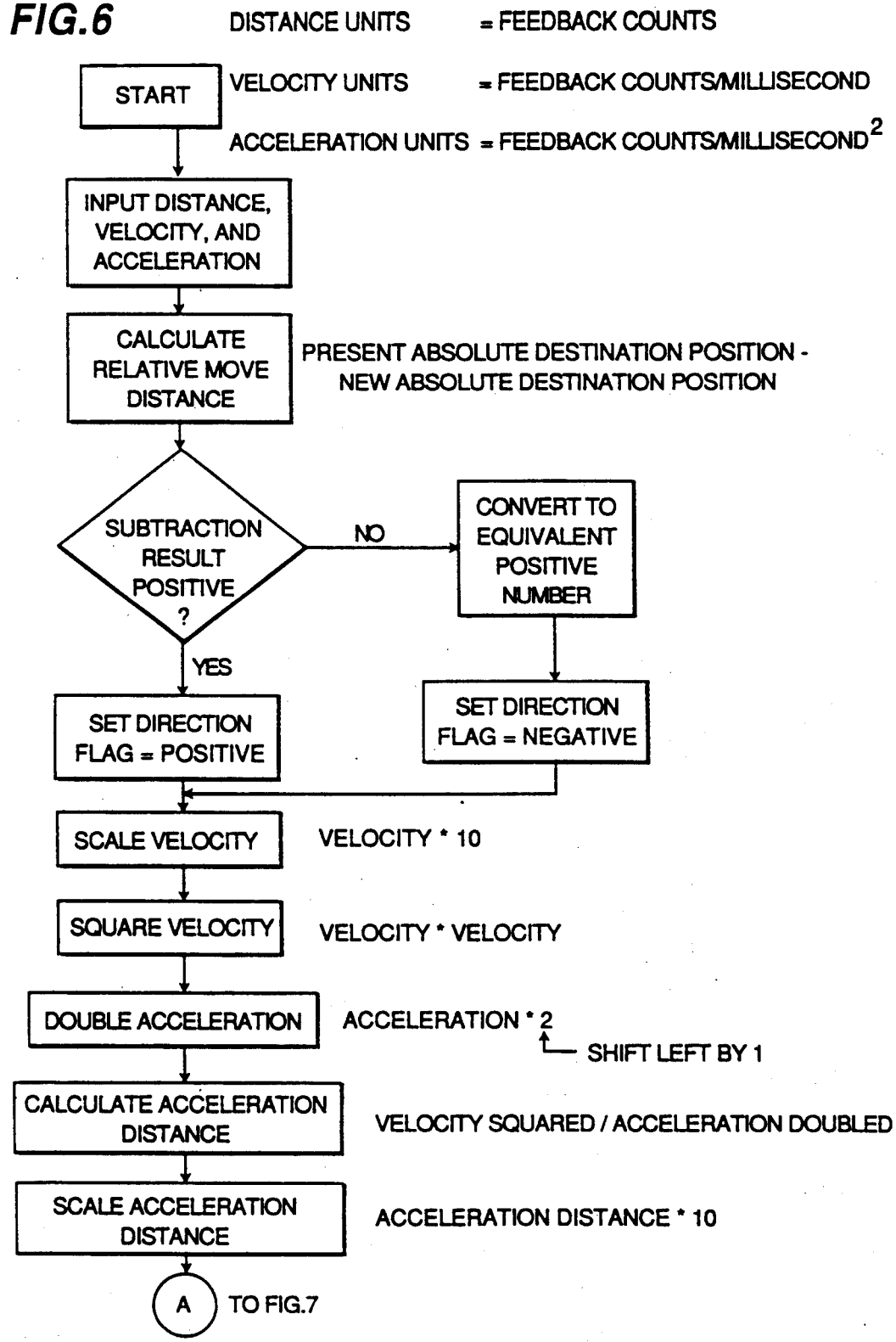
FIGS. 6–10 are flow charts of the detailed precalculations shown in FIG. 3.
Figure 7:
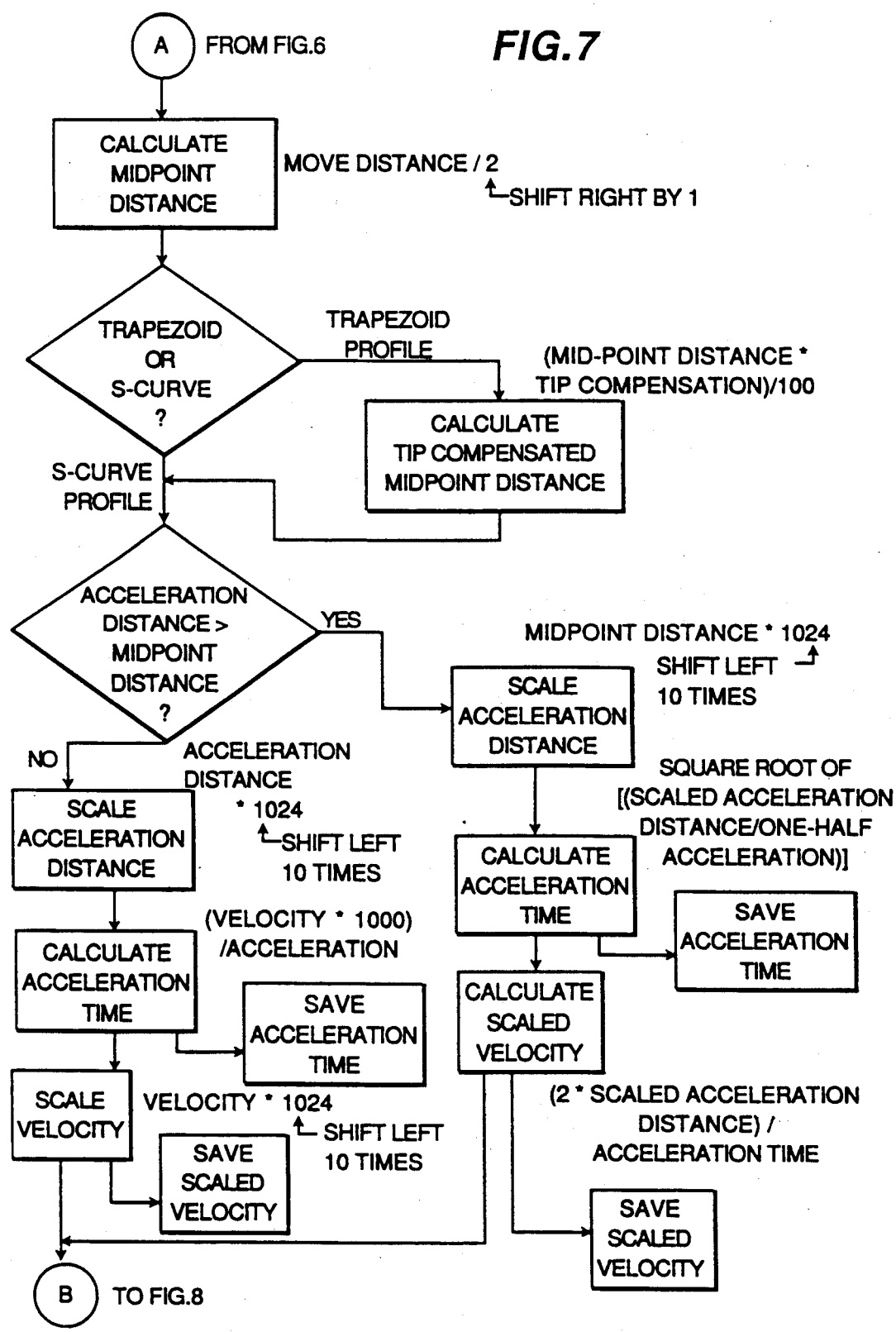
Figure 8:
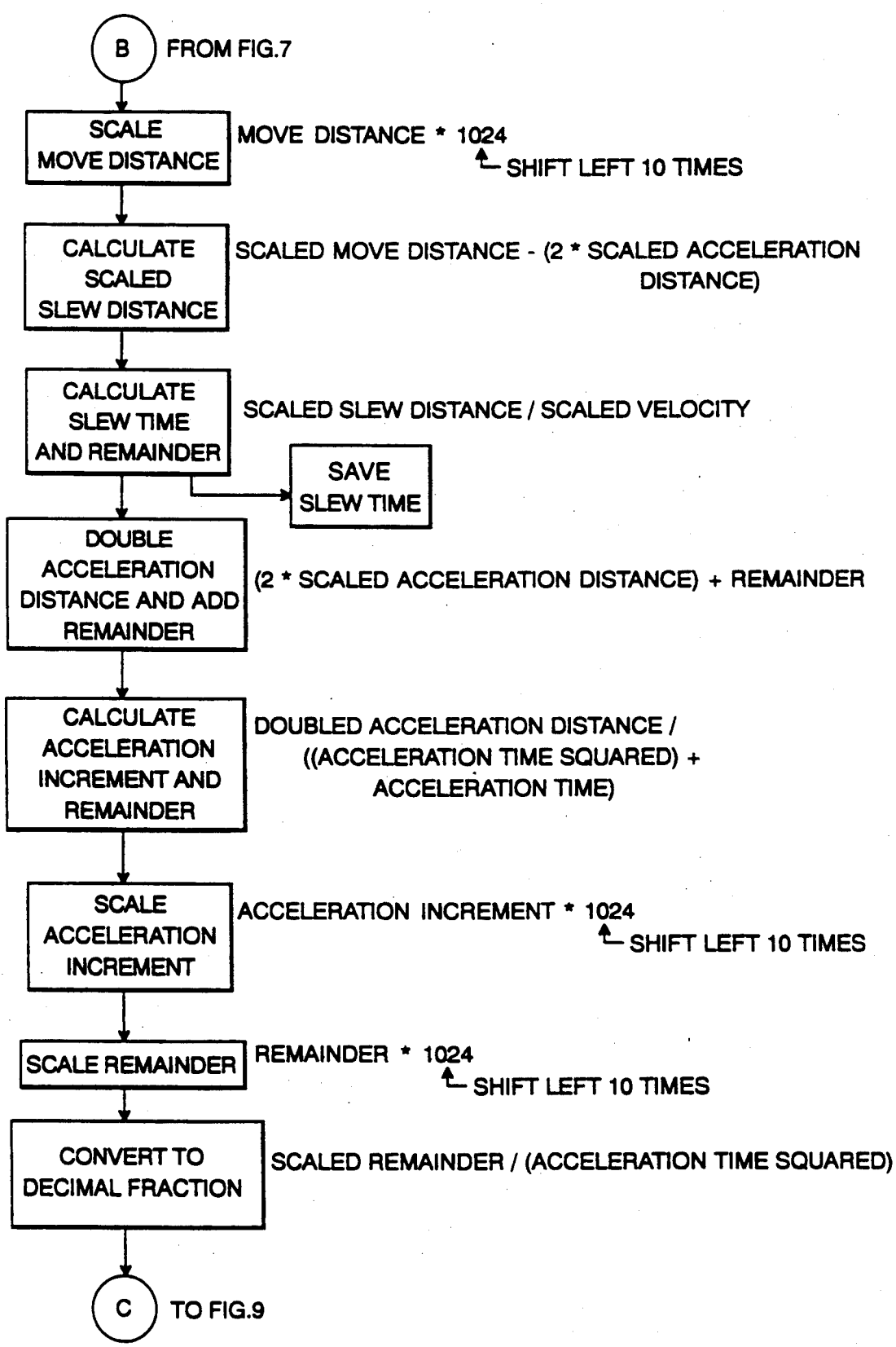
Figure 9:
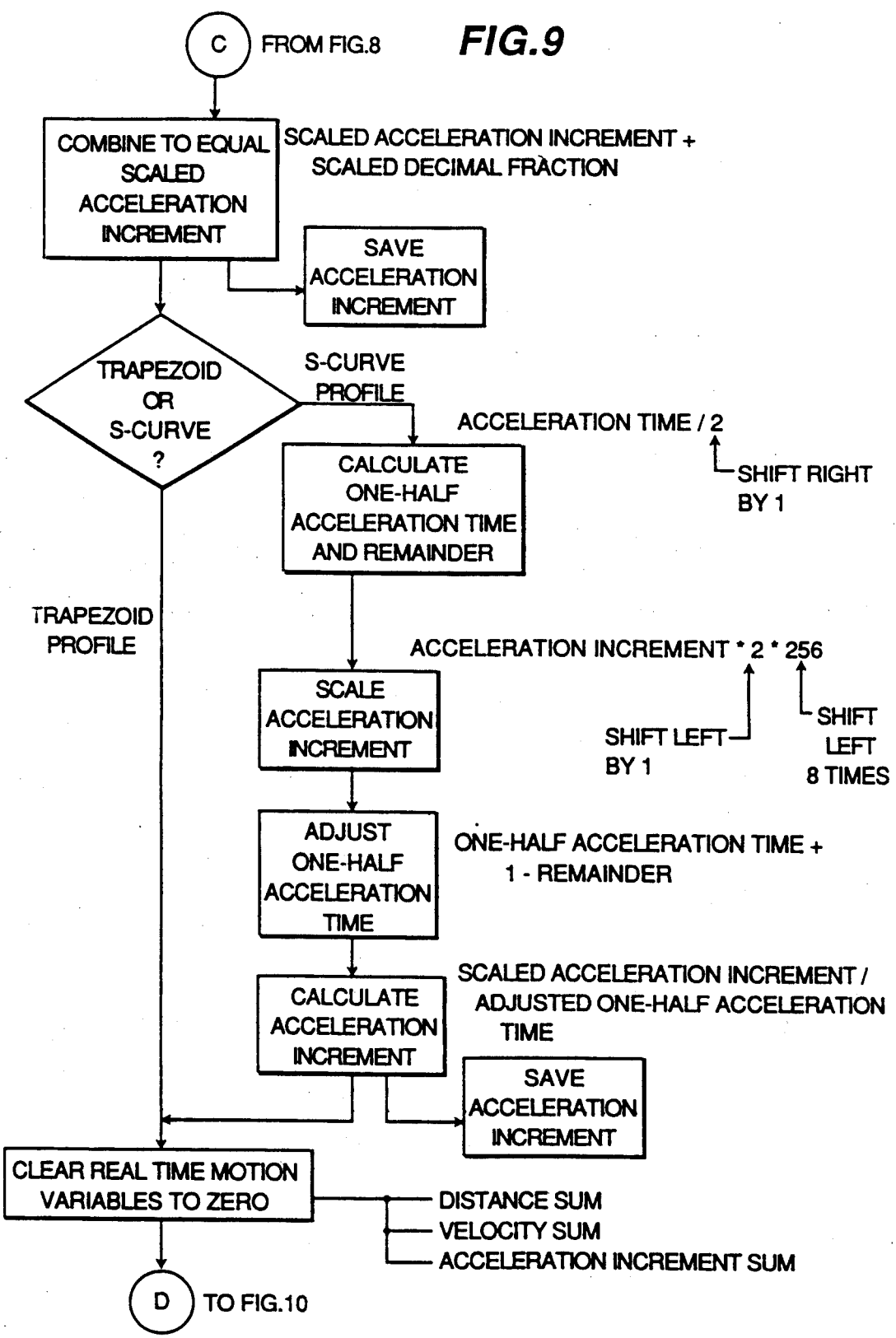
Figure 10:
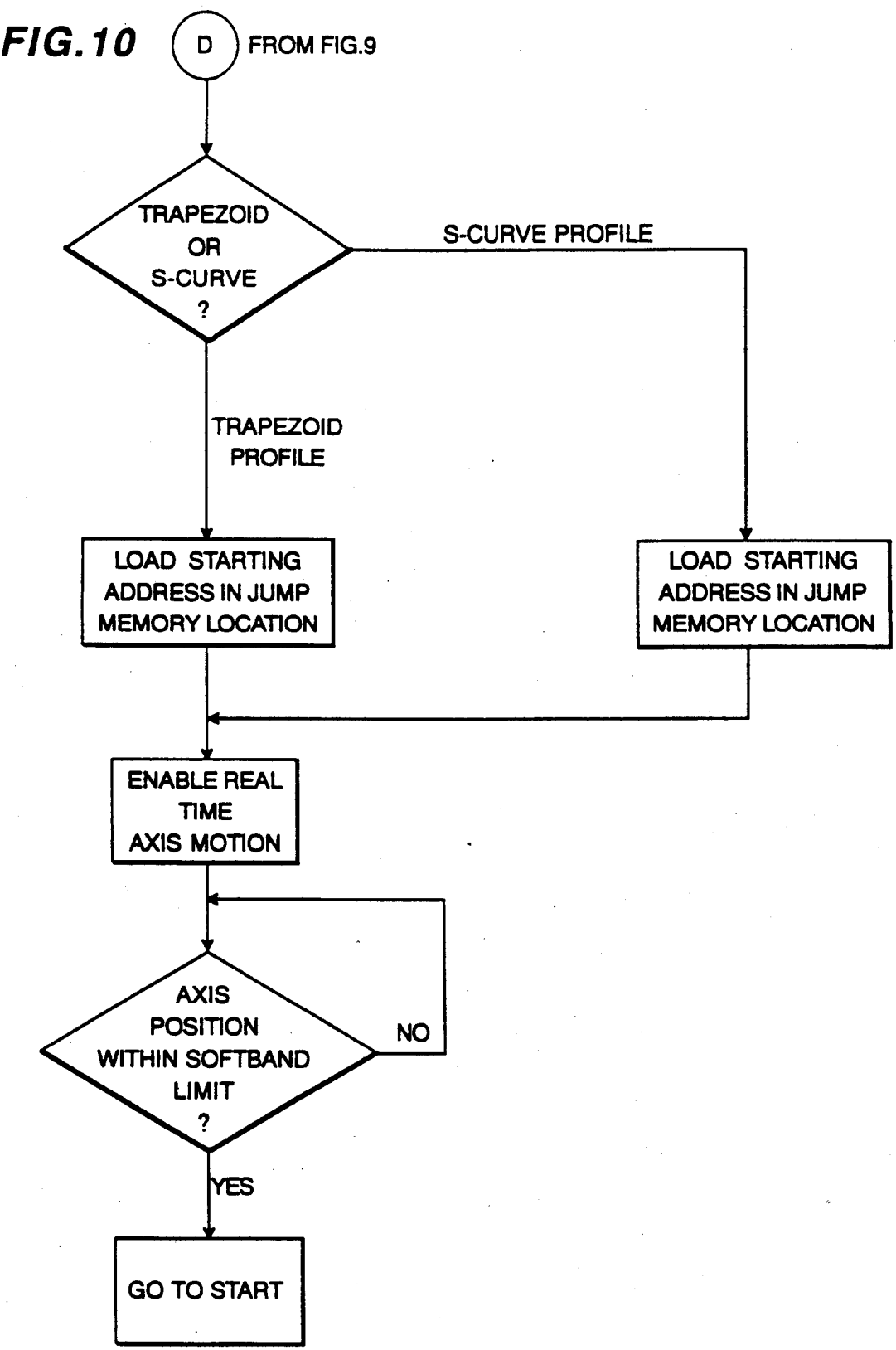
Figure 14:
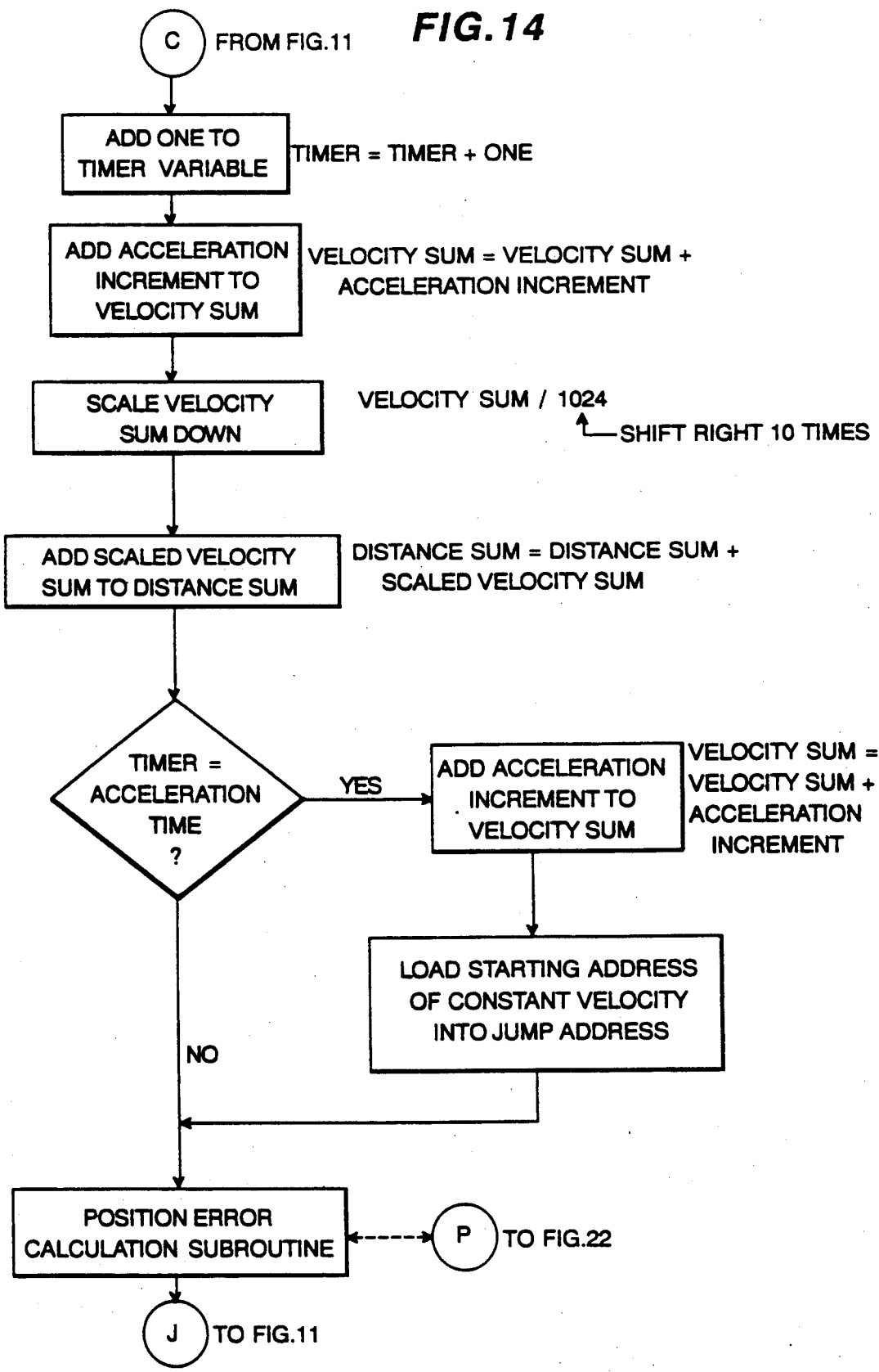
FIG. 14 is a flow chart of the acceleration portion of the motion profile in accordance with the second preferred embodiment illustrated in FIG. 5.
Figure 15:
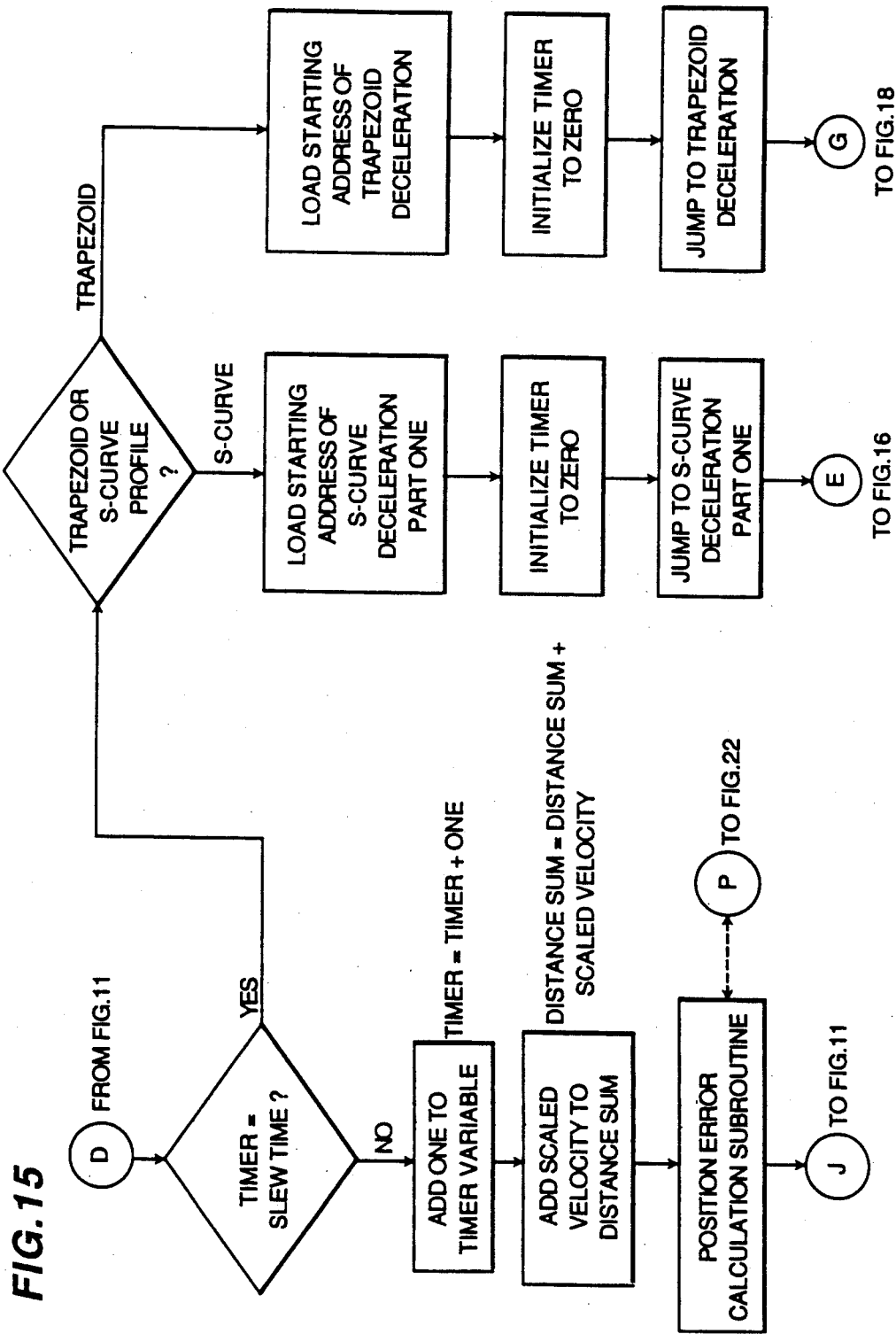
FIG. 15 is a flow chart of the constant velocity portion of the motion profile.
Figure 16:
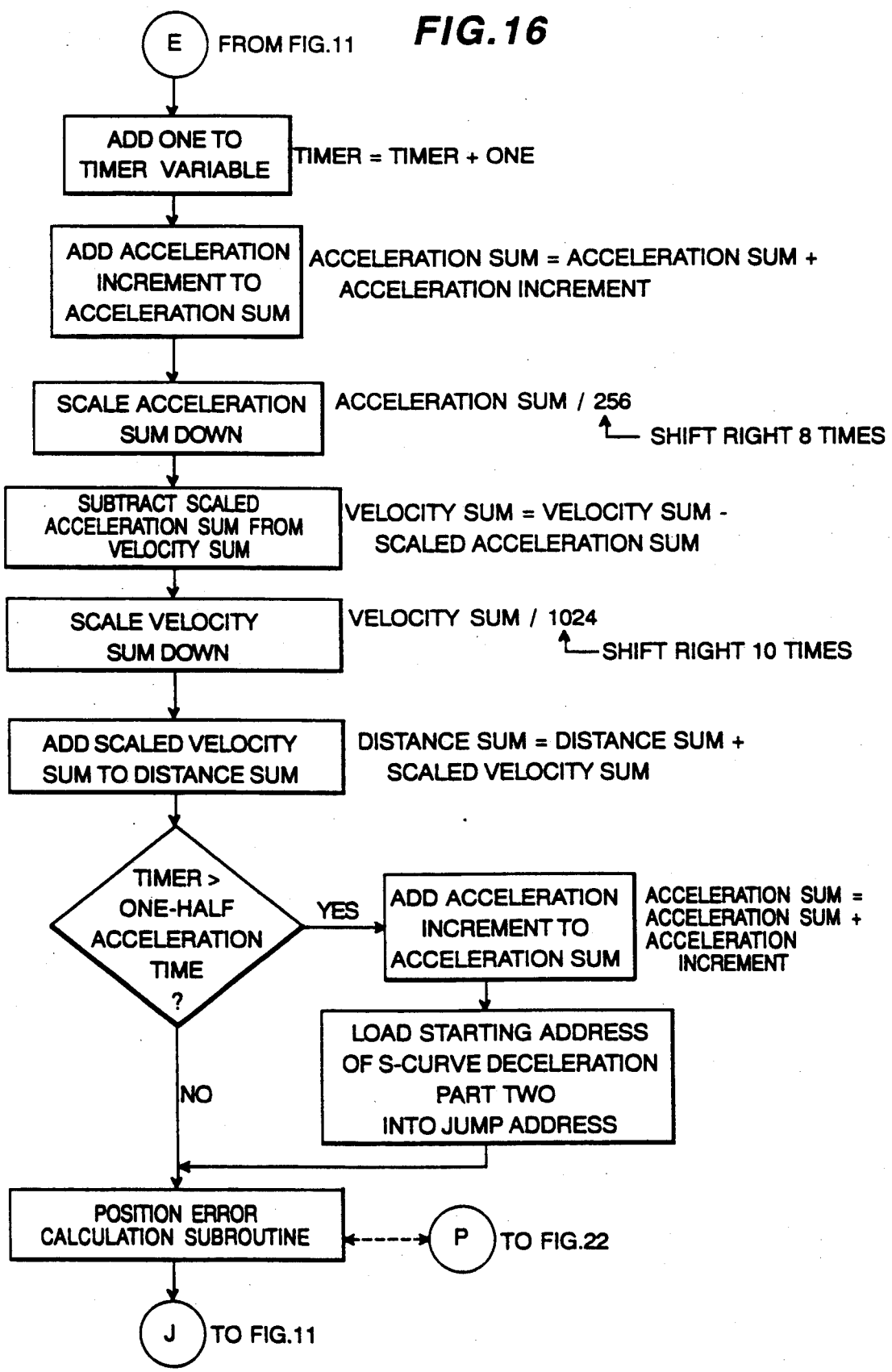
FIGS. 16 and 17 are flow charts of the deceleration portion of the motion profile in accordance with the first preferred embodiment illustrated in FIG. 4.
Figure 17:
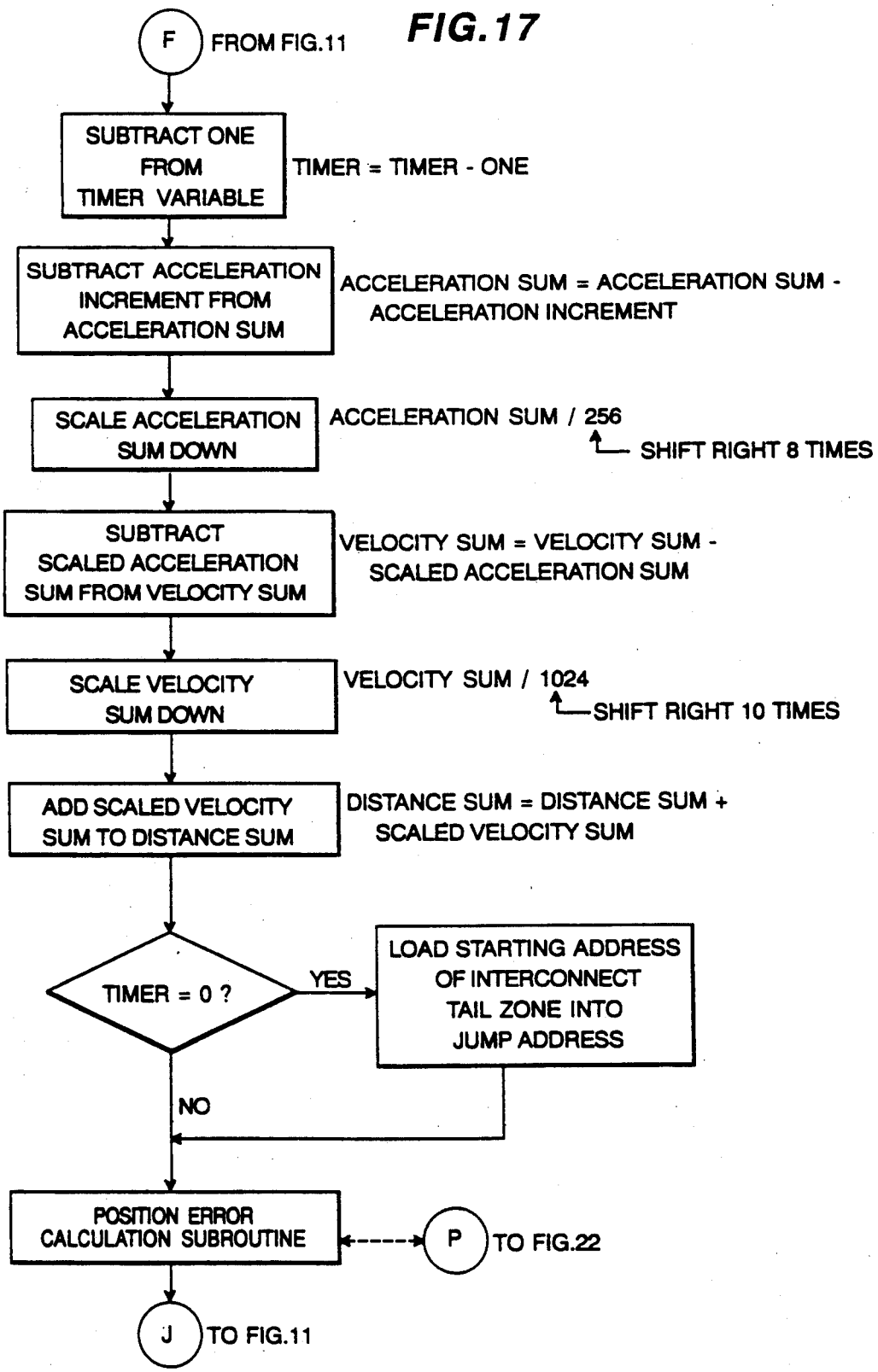
Figure 18:
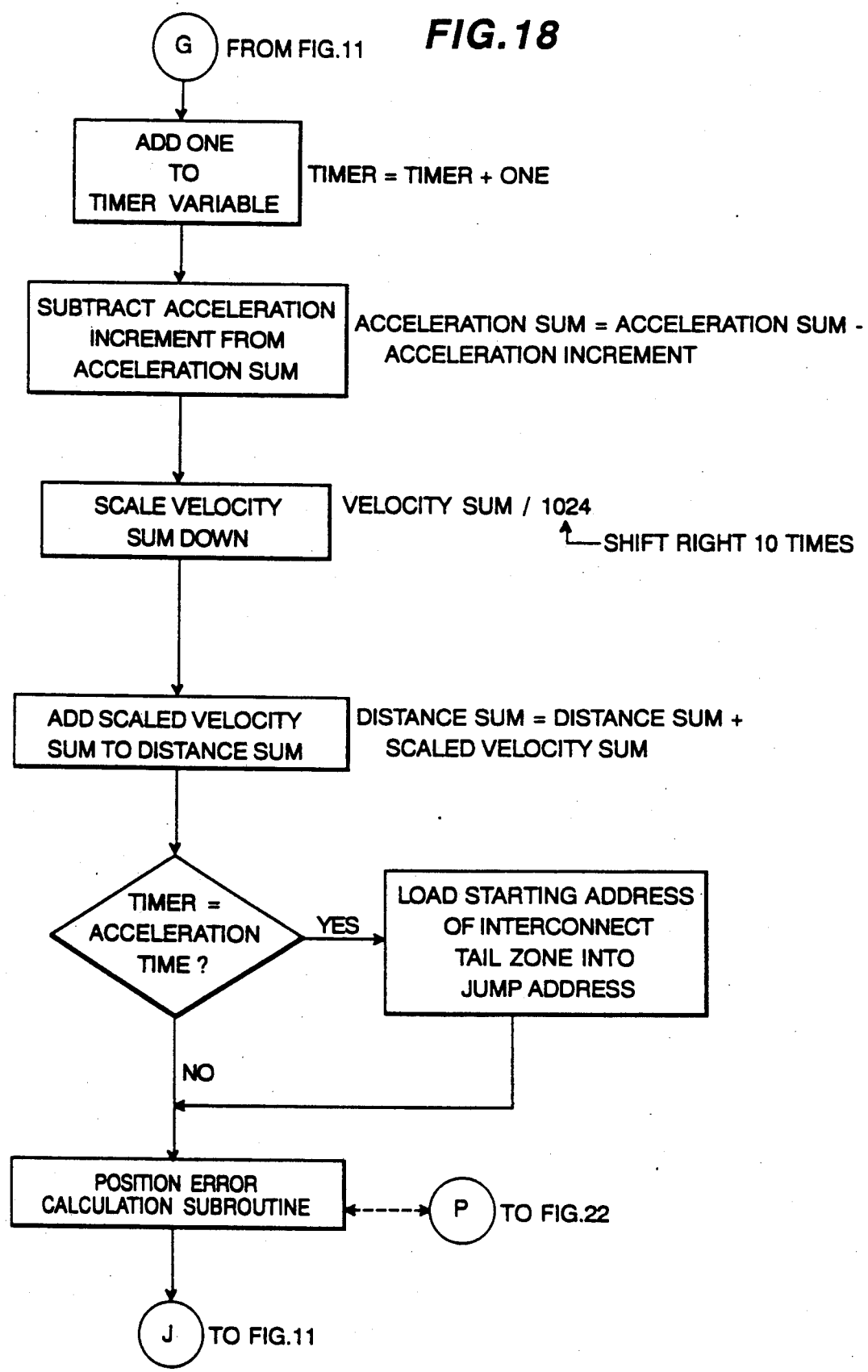
FIG. 18 is a flow chart of the deceleration portion of the motion profile in accordance with the second preferred embodiment illustrated in FIG. 5.

The trapezoid profile real time calculations are summarized in FIGS. 5 and shown in detail in FIGS. 14, 15 and 18. During each one millisecond time interval the acceleration increment is added to the previous velocity sum. The distance is calculated by adding the velocity sum to the previous distance sum.

Velocity($t$)=Velocity($t-1$)+Acceleration

Distance($t$)=Distance($t-1$)+Velocity($t$)

When velocity equals or exceeds preprogram constant velocity or tip compensated velocity the profile generator equations at each one millisecond time interval change to:

Velocity($t$)=Constant velocity

—or—

Velocity($t$)=Tip compensated constant velocity

Distance($t$)=Distance($t-1$)+Velocity($t$)

During deceleration at each one millisecond time interval the profile generator equations are:

Velocity($t$)=Velocity($t-1$)−Acceleration

Distance($t$)=Distance($t-1$)+Velocity($t$)

S-curve Profile Real Time Calculations

Figure 4:
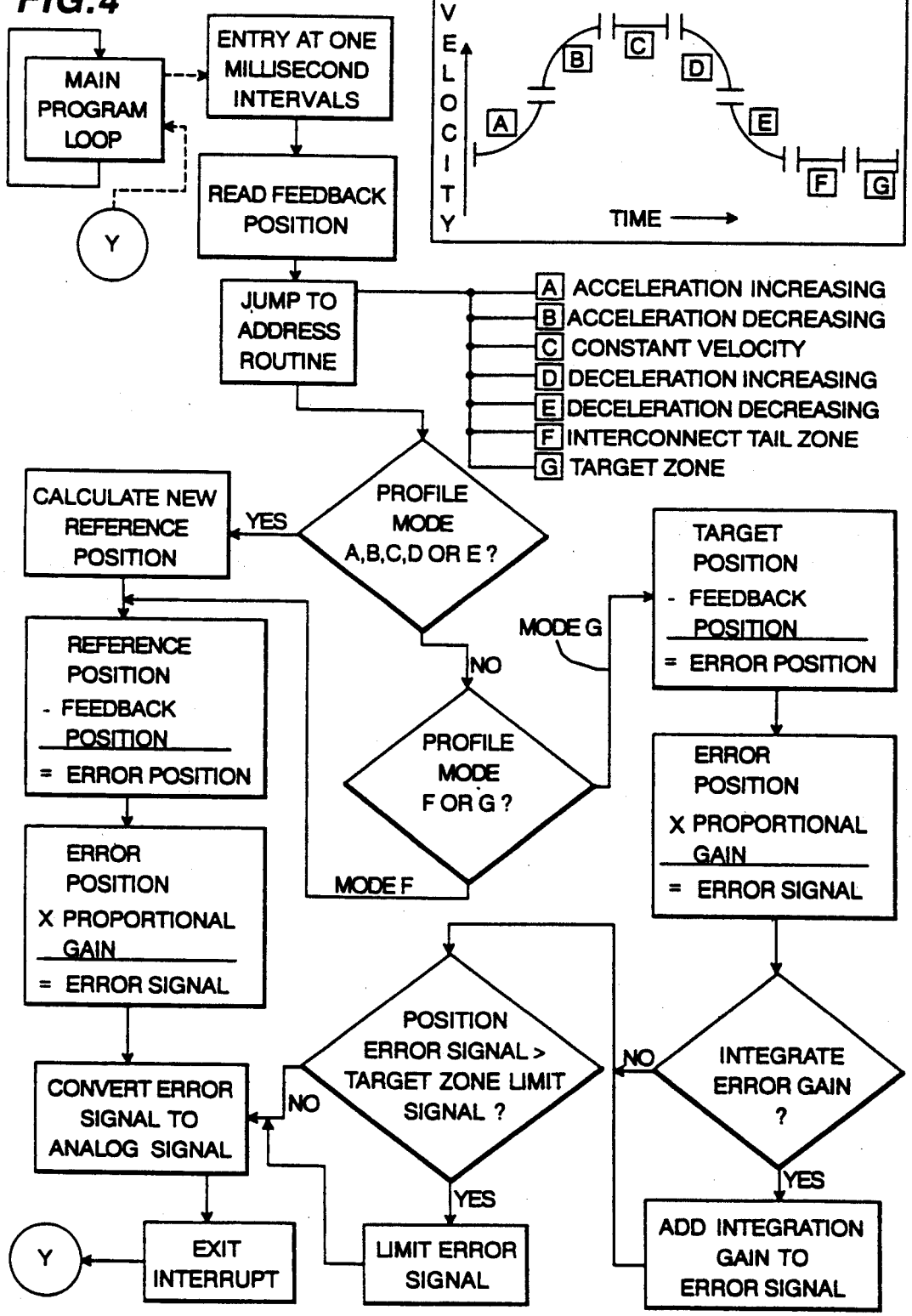
FIG. 4 is a flow chart of the real time interrupt in accordance with a first preferred embodiment of the present invention.

The s-curve profile real time calculations are summarized in FIG. 4 and shown in detail in FIGS. 12, 13 and 15–17. During each one millisecond time interval the acceleration increment is added to the previous acceleration sum for one-half the acceleration time. During the second half of acceleration time the acceleration increment is subtracted from the previous acceleration sum. The acceleration sum is added to the previous velocity sum. The distance is calculated by adding the velocity sum to the previous distance sum.

First half of acceleration time:
Acceleration($t$) = Acceleration($t-1$) + Acceleration increment Second half of acceleration time:
Acceleration($t$) = Acceleration($t-1$) − Acceleration increment Velocity($t$) = Velocity($t-1$) + Acceleration($t$)
Distance($t$) = Distance($t-1$) + Velocity($t$)

When velocity equals or exceeds preprogram constant velocity the profile generator equations at each one millisecond time interval change to:

Velocity($t$)=Constant velocity

Distance($t$)=Distance($t-1$)+Velocity($t$)

During each one millisecond time interval the acceleration increment is added to the previous acceleration sum for one-half the acceleration time. During the second half of the acceleration time the acceleration increment is subtracted from the previous acceleration sum. The acceleration sum is subtracted from the previous velocity sum. The distance is calculated by adding the velocity sum to the previous distance sum.

First half of acceleration time:
Acceleration($t$) = Acceleration($t-1$) + Acceleration increment Second half of acceleration time:
Acceleration($t$) = Acceleration($t-1$) − Acceleration increment Velocity($t$) = Velocity($t-1$) − Acceleration($t$)
Distance($t$) = Distance($t-1$) + Velocity($t$)

Figure 19:
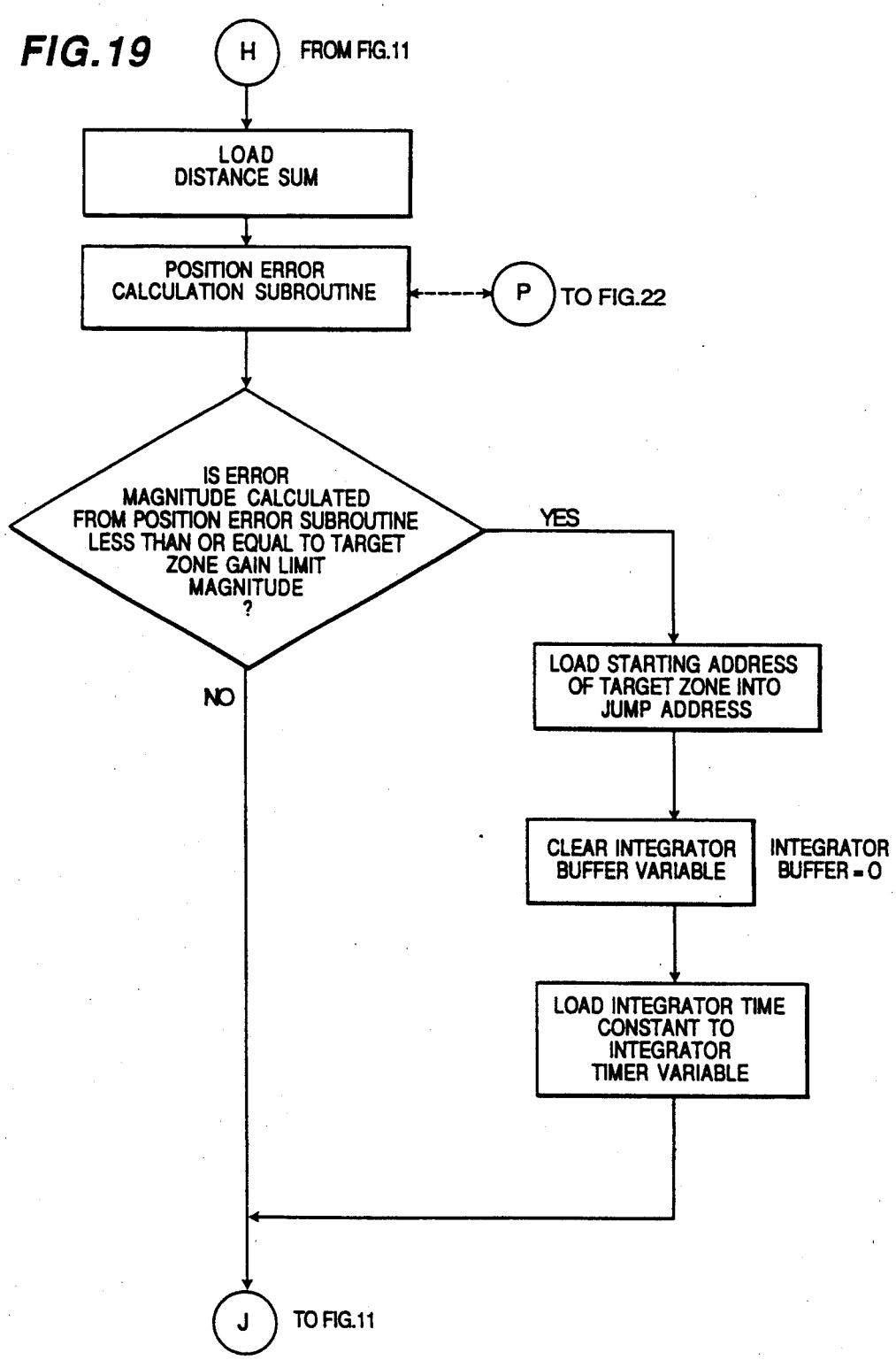
FIG. 19 is a flow chart of the interconnected tail portion of the motion profile.

After the profile generator completes the total distance commanded the software signals the changes required to switch into the target zone mode, as shown in FIG. 19. The interconnect zone illustrated in this figure provides a continuous velocity between the end of the reference profile and the target zone. If the magnitude of the position follow error is greater than the target zone gain limit, the system continues to control the loop from the main profile (which has finished and therefore the reference remains the target position). When the magnitude of the velocity error is equal to or less than the target zone gain limit, the system then switches to the target zone control loop. In this way, the system eases into the target zone control loop without creating jerk forces.

Software Feedback Calculations

Figure 22:
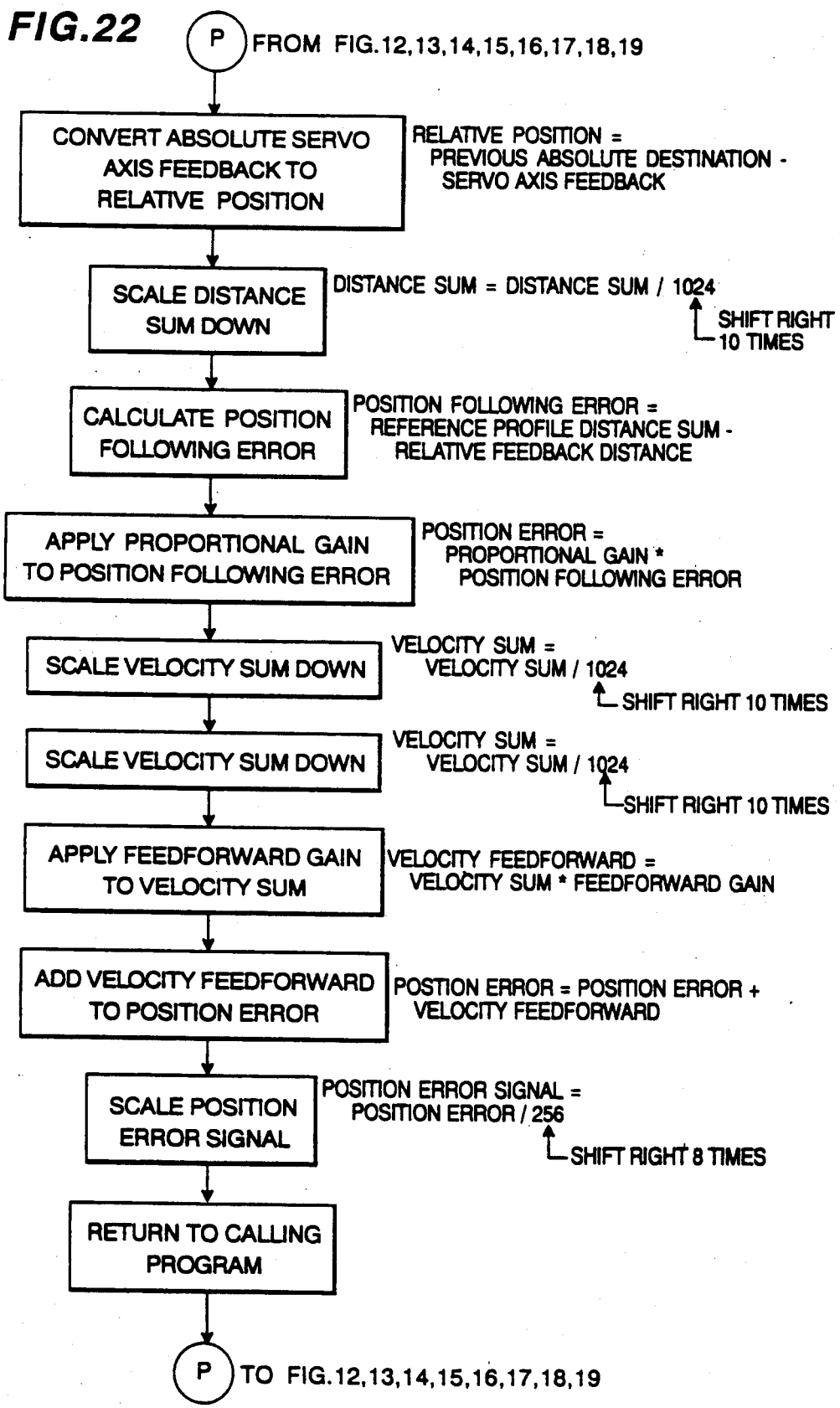
FIG. 22 shows a position error calculation subroutine in accordance with a preferred embodiment of the present invention.

At one millisecond intervals the processor does a complete position feedback calculation. The first calculation computes the position difference between the profile reference position and the actual encoder feedback position. This value is called the position following error. The position error calculation subroutine is shown in FIG. 22. The position following error is multiplied by a programmable proportional gain parameter, scaled and sent out to the servo amplifier as a position error signal. This is in effect until the axis reaches the target zone.

Position error signal=(proportional gain * follow error)/256

Figure 20:
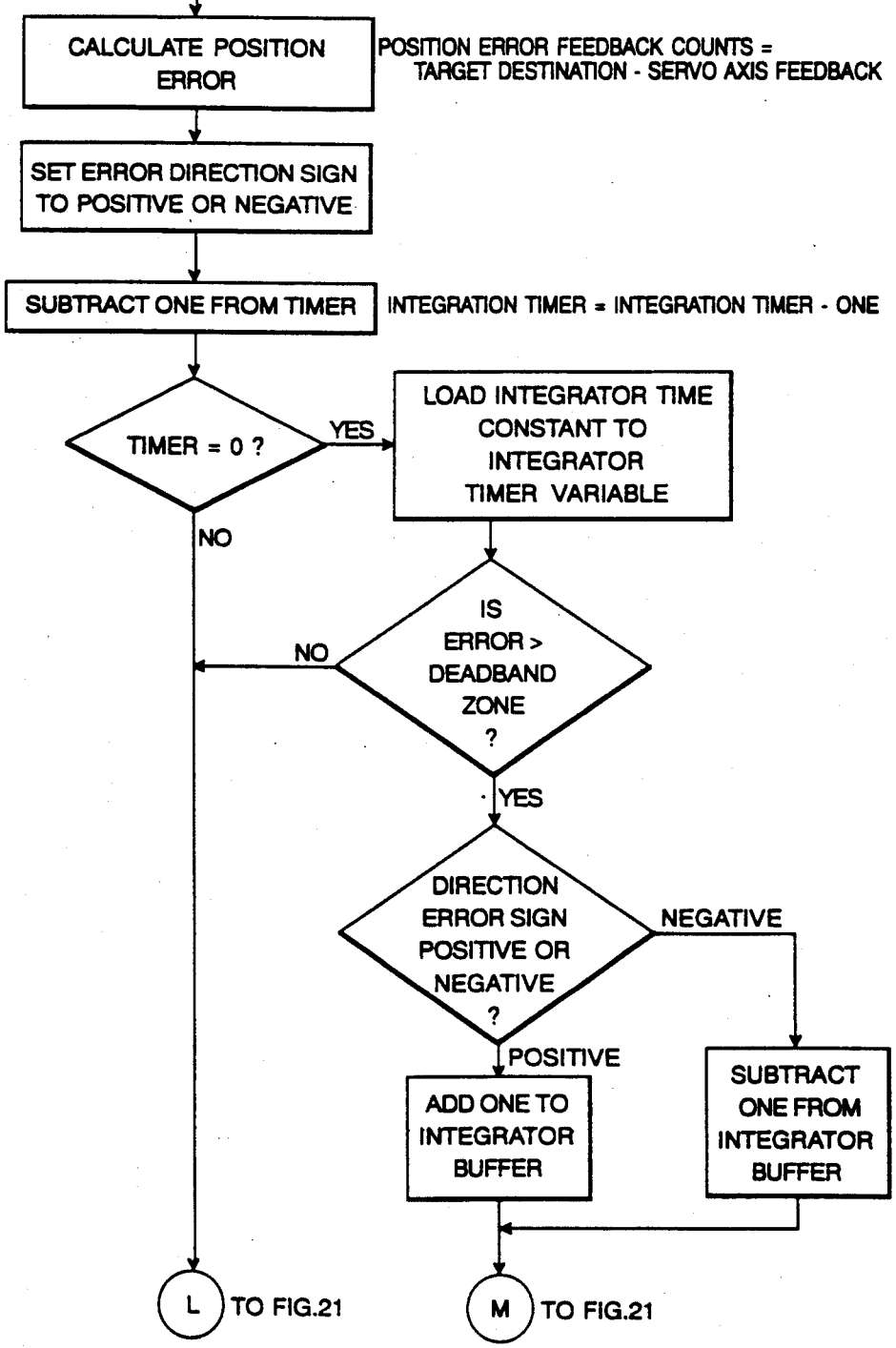
FIGS. 20 and 21 are flow charts of the target zone.
Figure 21:
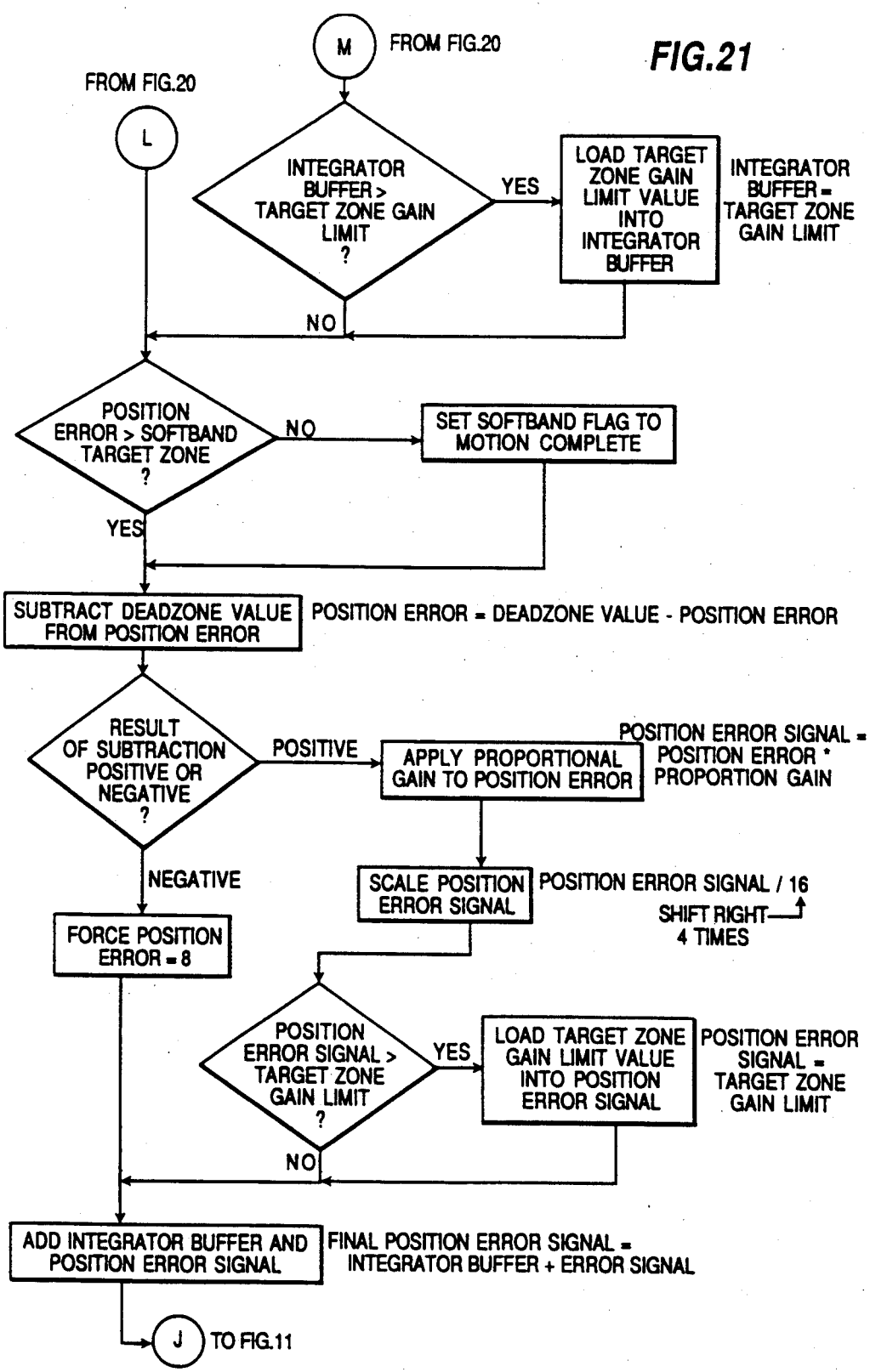

When the axis reaches the target zone, then position error is accumulated (integrated), as shown in FIGS. 20 and 21. This allows the software to compensate for static disturbances that would otherwise keep the position error from becoming zero when the axis has stopped moving. Such static disturbances include friction, springs, windup, and gravitational forces. The gain is determined by the target zone proportional gain parameter and the integration time constant parameter. The torque is then range limited by the target zone gain limit parameter and sent out to the servo amplifier.

Position error signal=(proportional gain * error counts)/16+integral gain

In addition the deadband window parameter determines the lock on target zone. If the deadband window is set to zero then the axis will lock on target within + or − one half an encoder count.

The software is also capable of providing velocity feedforward compensation. This is accomplished in software by precomputing the reference command velocity and adding this quantity, scaled by the feedforward gain parameter to the position error signal. This will reduce the intrinsic following error or lagging position error.

Velocity feedforward = (feedforward gain * velocity)/256

Each of the gain terms mentioned above has a unique influence on the closed-loop dynamics of the system. By adjusting the various parameters it is easy to tailor the system dynamics to meet specific needs. The programmable control gains influence the closed-loop dynamics in the following way:

Proportional Gain ———> Elastic Stiffness

Integral Gain ———> Static Disturbance Compensation

Feedforward Gain ———> Constant Bias Force

Tuning Parameters

Tuning parameters allow a wide range of adjustments to satisfy all requirements of servo system performance.

The Velocity Parameter

The velocity parameter determines the maximum slew velocity the axis travels toward its target position. The axis travels at this constant velocity until it must begin to decelerate in order to stop near the target position. This parameter is in effect outside the target zone.
UNITS = feedback counts/millisecond
RANGE = 1 to 800

Acceleration Parameter

This parameter determines the acceleration rate at which the axis begins its move toward the target position. The axis accelerates at this constant rate until it reaches the slew velocity or it must begin deceleration to stop near the target position. Deceleration is equal to the acceleration rate. This parameter is in effect outside the target zone.
UNITS = feedback counts/millisecond-squared
RANGE = 1 to 65,536

Proportional Gain Parameter

This proportional gain parameter determines the amount of gain applied to the position error signal. Adjustment of this parameter controls the smoothness or stiffness of the actual servo motor motion profile. This parameter is in effect outside the target zone.
RANGE = 1 to 65,535

Feed Forward Gain Parameter

The feed forward gain parameter determines the amount of precomputed reference command velocity added to the position error. Adjustment of this parameter controls the amount of lag in the actual position versus the reference generator profile position This parameter aids adjustment of the control loop if the mechanical system does not allow sufficient proportional gain amounts due to instabilities and compliance. This parameter is in effect outside the target zone.
RANGE = 1 to 65,536

Tip Compensation Parameter

The tip compensation parameter determines the amount of peak velocity removed when the motion profile is triangular. This reduces the "jerk" force produced when acceleration changes to deceleration at the midpoint of the incremental move. This parameter is in effect outside the target zone.
UNITS = Percent of peak velocity
RANGE = 1 to 100

Target Zone Proportional Gain Parameter

The target zone gain parameter determines the amount of proportional gain applied to the position error signal. The target zone mode is latched when the profile generator command has completed the trajectory and remains latched until a new destination is commanded. This parameter is in effect only when the system enters the target zone.
RANGE = 1 to 65,536

Integration Time Constant Parameter

The integration time constant determines the speed of applied signal gain added to the proportion gain whenever the position error is not equal to the target window. The integration signal gain is fixed at 2.5 millivolts. This parameter is only in effect when the system enters the target zone.
UNITS = milliseconds
RANGE = 1 to 65,536

Target Zone Gain Limit Parameter

The target zone gain limit parameter determines the maximum amount of gain applied by proportional gain and integration gain. This "clamps" the error signal preventing instability if a large error exists or an error exists for a large amount of time. This parameter is only in effect when the system enters the target zone.
RANGE = 1 to 65,536

Dead Band Target Window Parameter

This value defines a distance in encoder error counts which extends in both directions from the target position. When the axis is within this distance of target position the system is considered to be "in-position" and settled. The proportional gain value is equal to zero and the integration gain value is held constant to the value of applied gain needed to enter the dead band window. The goal of every closed-loop servo system is to position to the greatest accuracy possible utilizing the full resolution of the encoder feedback system. In some systems mechanical backlash is present between the encoder feedback location and the servo motor drive shaft. This is a conditionally unstable system and the target dead band window has to be adjusted to a value greater than the mechanical backlash angle thus preventing oscillation around the target zone.
UNITS = feedback counts
RANGE = 0 to 65,536

Position Following Error Parameter

This parameter determines the maximum allowable position error allowed outside the target zone. When the axis is in motion the actual position is compared with the reference profile generator position at one millisecond intervals. If the magnitude of the position error exceeds the preprogram position following error parameter the axis executes an error shut down forcing the servo motor to a complete stop with full electrical braking power. This parameter is in effect outside the target zone.

UNITS=feedback counts
RANGE=0 to 65,536

FIGS. 23-26 show the software code for a preferred position profile generator model algorithm in Quick Basic ™. Of course, any suitable program could be used.

The foregoing is for illustrative purposes only. Modifications can be made within the scope of the invention as defined by the appended claims.

I claim:

1. An advanced digital motion control system for providing multi-axis single microprocessor closed loop point to point positioning to a servo motor system with acceleration, deceleration and velocity control, said system comprising:
   precalculation means for precalculating a reference position motion profile and servo gain coefficients for each of a plurality of axes;
   calculating means for calculating the position and velocity at discrete time intervals to determine a real time motion profile for a plant being controlled;
   comparison means for comparing the plant real time motion profile to said reference motion profile; and
   error adjustment means for adjusting the error along each individual axis by adding a controlled amount of gain to the servo motor system to reduce the error to zero, thereby commanding each of said axes to be at a certain target position at a certain time throughout the point to point positioning of the servo motor system.

2. An advanced digital motion control system as in claim 1, wherein said real time motion profile is trapezoidal.

3. An advanced digital motion control system as in claim 1, wherein said real time motion profile is S-shaped.

4. An advanced digital motion control system as in claim 1, further comprising a position error detection window means for detecting errors in the servo axis system.

5. An advanced digital motion control system as in claim 1, wherein said precalculation means includes means for inputting tuning parameters.

6. An advanced digital motion control system as in claim 5, wherein said tuning parameters include a velocity parameter that determined the maximum slew velocity that each axes travels toward its corresponding target position.

7. An advanced digital motion control system as in claim 5, wherein said tuning parameters includes an acceleration parameter that determines the acceleration rate at which each axis begins its move toward said target position.

8. An advanced digital motion control system as in claim 5, wherein said tuning parameters includes a proportional gain parameter that determined the amount of gain applied to said error adjustment means.

9. An advanced digital motion control system as in claim 5, wherein said tuning parameters includes a feed forward gain parameter that determines the amount of precomputed reference command velocity applied to said error adjustment means.

10. An advanced digital motion control system as in claim 5, wherein said tuning parameters includes a tip compensation parameter that determines the amount of peak velocity removed when said reference position motion profile is triangular.

11. A method of providing multi-axis single microprocessor closed loop point positioning to a servo motor system, said method comprising:
    inputting destination, velocity and acceleration values;
    inputting servo tuning parameters to lock on said destination;
    precalculating real time motion variables;
    selecting either a trapezoidal or S-shaped velocity-time profile;
    initializing the precalculated variables to start real time motion;
    comparing plant real time motion to said velocity-time profile; and
    adjusting an error along each of a plurality of axes by adding a controlled amount of gain to the servo motor system to reduce the error to zero, and thereby commanding each of said axes to be at a certain target position at a certain time throughout the point to point positioning of the servo motor system.

* * * * *